United States Patent
Lee et al.

(10) Patent No.: US 10,163,147 B2
(45) Date of Patent: Dec. 25, 2018

(54) SYSTEMS AND METHODS OF LOCATION BASED MERCHANT RECOMMENDATIONS

(71) Applicant: MasterCard International Incorporated, Purchase, NY (US)

(72) Inventors: Edward M. Lee, Scarsdale, NY (US); Tong Zhang, Fort Lee, NJ (US); Qian Wang, Ridgefield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 417 days.

(21) Appl. No.: 14/966,838

(22) Filed: Dec. 11, 2015

(65) Prior Publication Data
US 2017/0169497 A1    Jun. 15, 2017

(51) Int. Cl.
*G06Q 30/00*    (2012.01)
*G06Q 30/06*    (2012.01)

(52) U.S. Cl.
CPC ................. *G06Q 30/0631* (2013.01)

(58) Field of Classification Search
CPC .......................................... G06Q 30/06–30/08
USPC .................................................. 705/26.1–27.2
See application file for complete search history.

(56) References Cited

U.S. PATENT DOCUMENTS

| 8,756,187 | B2 | 6/2014 | Wilson et al. |
| 9,767,471 | B1* | 9/2017 | Perrone ............... G06Q 30/0205 |
| 2009/0271246 | A1* | 10/2009 | Alvarez ................. G06Q 30/02 705/7.29 |
| 2012/0109749 | A1 | 5/2012 | Subramanian et al. |
| 2014/0188530 | A1* | 7/2014 | Patterson ............... G06Q 30/02 705/7.11 |
| 2014/0279185 | A1* | 9/2014 | Merz ................... G06Q 30/0631 705/26.7 |
| 2014/0372338 | A1 | 12/2014 | Kim et al. |

* cited by examiner

*Primary Examiner* — Ethan D Civan
(74) *Attorney, Agent, or Firm* — Armstrong Teasdale LLP

(57) ABSTRACT

A method for generating a list of recommended merchants based on an input merchant is provided. The method uses a recommender computing device. The method includes receiving an input merchant identifier, retrieving a first electronic data signal based on the input merchant identifier including historical transaction data of the input merchant including historical payment transactions initiated by candidate cardholders with the input merchant, and storing a list of the candidate cardholders. The method further includes retrieving a second electronic data signal that includes historical transaction data for at least some of the candidate cardholders included in the list of candidate cardholders and a candidate merchant identifier that identifies the candidate merchants, generating a list of candidate merchants from the second data signal including a ranking of the candidate merchants, and generating a list of recommended merchants based on the list of candidate merchants.

20 Claims, 7 Drawing Sheets

SYSTEMS AND METHODS OF LOCATION BASED MERCHANT RECOMMENDATIONS

BACKGROUND OF THE DISCLOSURE

The field of the invention relates generally to generating recommendations based on a location of a potential customer, and, more specifically, to network-based methods and systems for generating a set of recommended merchants associated with an input merchant based on merchants visits associated with cardholders who previously transacted with the input merchant.

Consumers are interested in receiving recommendations for merchants to visit, and some merchants may be interested in providing recommendations of other merchants to consumers. For example, a consumer may be staying at a hotel operated by a first input merchant, and the consumer may seek recommendations for other merchants (second merchants) to visit such as restaurants or attractions. The first merchant may be unable to provide such a recommendation because the merchant or employee of the merchant that is asked for the recommendation lacks the necessary information to make such a recommendation. By way of example, the hotel may have a concierge desk or service with limited staff which makes receiving a recommendation from the concierge difficult for hotel patrons. And, in some cases, some hotels may not have a concierge service for providing such recommendations. Hotel customers at these types of hotels may have difficulty finding merchants/attractions to patronize. The hotels may wish to provide recommendations but are unable to without a concierge service. Moreover, even for those hotels that have a concierge service, the recommendations provided are usually based on the personal experience of the concierge and not on objective visit data. Accordingly, it is desirous to have a system that provides a list of recommended merchants based, in part, on transaction data of customers of the recommending merchant.

BRIEF DESCRIPTION OF THE DISCLOSURE

In one aspect, a method for generating a list of recommended merchants based, at least in part, on an input merchant is provided. The method being implemented using a recommender computing device in communication with a memory and a payment processor. The method includes receiving, by the recommender computing device, an input merchant identifier for identifying the input merchant, retrieving by the recommender computing device a first electronic data signal from a database associated with the payment processor based at least in part on the input merchant identifier wherein the first data signal includes historical transaction data of the input merchant including a plurality of historical payment transactions having been initiated by candidate cardholders with the input merchant, and storing a list of the candidate cardholders in the memory from the first electronic data signal. The method further includes retrieving, by the recommender computing device, a second electronic data signal from the payment processor database wherein the second data signal includes historical transaction data for at least some of the candidate cardholders included in the list of candidate cardholders, and wherein the historical transaction data for the candidate cardholders includes a candidate merchant identifier that identifies the candidate merchants involved in the transactions. The method further includes generating a list of candidate merchants from the second data signal including a ranking of the candidate merchants, and generating a list of recommended merchants based on the list of candidate merchants.

In another aspect, a recommender computing device including at least one processor in communication with a memory is provided. The recommender computing device is in communication with a payment processor. The at least one processor is programmed to receive an input merchant identifier for identifying the input merchant, retrieve a first electronic data signal from a database associated with the payment processor based at least in part on the input merchant identifier wherein the first data signal includes historical transaction data of the input merchant including a plurality of historical payment transactions having been initiated by candidate cardholders with the input merchant, and store a list of the candidate cardholders in the memory from the first electronic data signal. The at least one processor is further programmed to retrieve a second electronic data signal from the payment processor database, wherein the second data signal includes historical transaction data for at least some of the candidate cardholders included in the list of candidate cardholders, and wherein the historical transaction data for the candidate cardholders includes a candidate merchant identifier that identifies the candidate merchant involved in the transactions. The at least one processors is further programmed to generate a list of candidate merchants from the second data signal including a ranking of the candidate merchants, and generate a list of recommended merchants based on the list of candidate merchants.

In a further aspect, a computer-readable storage medium having computer-executable instructions embodied thereon is provided. When executed by a recommender computing device including at least one processor in communication with a memory, the computer-executable instructions cause the recommender computing device to: receive an input merchant identifier for identifying the input merchant, retrieve a first electronic data signal from a database associated with the payment processor based at least in part on the input merchant identifier wherein the first data signal includes historical transaction data of the input merchant including a plurality of historical payment transactions having been initiated by candidate cardholders with the input merchant, and store a list of the candidate cardholders in the memory from the first electronic data signal. The computer-executable instructions further cause the recommender computing device to retrieve a second electronic data signal from the payment processor database, wherein the second data signal includes historical transaction data for at least some of the candidate cardholders included in the list of candidate cardholders, and wherein the historical transaction data for the candidate cardholders includes a candidate merchant identifier that identifies the candidate merchant involved in the transactions. The computer-executable instructions further cause the recommender computing device to generate a list of candidate merchants from the second data signal including a ranking of the candidate merchants, and generate a list of recommended merchants based on the list of candidate merchants.

BRIEF DESCRIPTION OF THE DRAWINGS

FIG. 1 is a schematic diagram illustrating an example multi-party payment card system for enabling payment-bycard transactions and generating merchant recommendations in accordance with one embodiment of the present disclosure.

FIG. 2 is an expanded block diagram of an example embodiment of a computer system used in processing payment transactions that includes a recommender computing device in accordance with one example embodiment of the present disclosure.

FIG. 3 illustrates an example configuration of a server system such as the recommender computing device of FIG. 2.

FIG. 4 illustrates an example configuration of a client system shown in FIG. 2.

FIG. 5 is a simplified data flow diagram for generating merchant recommendation using the recommender computing device of FIG. 2.

FIG. 6 is a simplified diagram of an example method for generating merchant recommendations and displaying said recommendation on a user interface using the recommender computing device of FIG. 2.

FIG. 7 is a diagram of components of one or more example computing device that may be used in the environment shown in FIG. 2.

Figure 1:
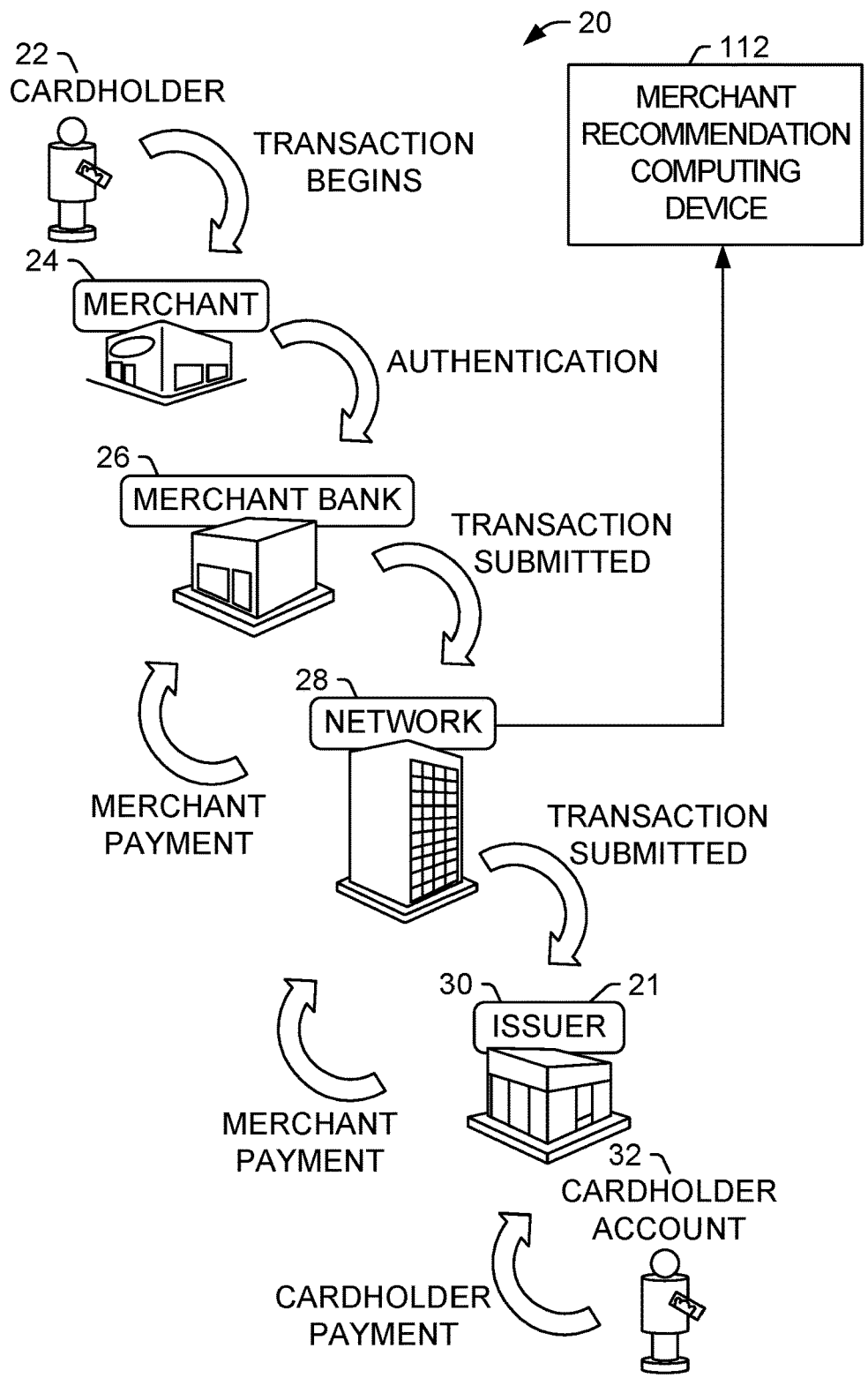
FIGS. 1-7 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The system and methods described herein facilitate the generation of a list of recommended merchants corresponding to customers of an input merchant. The system described herein (i) receives, by a recommender computing device, an input merchant identifier, the input merchant identifier for identifying the input merchant; (ii) retrieves, by the recommender computing device, a first electronic data signal from a database associated with the payment processor based at least in part on the input merchant identifier, the first data signal including historical transaction data of the input merchant including each (or at least some) historical payment transaction of a plurality of historical payment transactions having been initiated by candidate cardholders with the input merchant; (iii) stores a list of the candidate cardholders in the memory from the first electronic data signal; (iv) retrieves, by the recommender computing device, a second electronic data signal from the payment processor database, the second data signal including historical transaction data for each (or at least some) candidate cardholder included in the list of candidate cardholders, the historical transaction data for each (or at least some) candidate cardholder including a candidate merchant identifier for each (or at least some) transaction that identifies the candidate merchant involved in each of said transactions; (v) generates a list of candidate merchants from the second data signal including a ranking of the candidate merchants; and (vi) generates a list of recommended merchants based on the list of candidate merchants.

The systems and methods described herein are implemented by a computing device that may be referred to as a "recommender computing device." The recommender computing device includes a processor in communication with a memory. The recommender computing device is configured to: (i) receive, by the recommender computing device, an input merchant identifier, the input merchant identifier for identifying the input merchant; (ii) retrieve, by the recommender computing device, a first electronic data signal from a database associated with the payment processor based at least in part on the input merchant identifier, the first data signal including historical transaction data of the input merchant including each (or at least some) historical payment transaction of a plurality of historical payment transactions having been initiated by candidate cardholders with the input merchant; (iii) store a list of the candidate cardholders in the memory from the first electronic data signal; (iv) retrieve, by the recommender computing device, a second electronic data signal from the payment processor database, the second data signal including historical transaction data for each (or at least some) candidate cardholder included in the list of candidate cardholders, the historical transaction data for each (or at least some) candidate cardholder including a candidate merchant identifier for each (or at least some) transaction that identifies the candidate merchant involved in each (or at least some) of said transactions; (v) generate a list of candidate merchants from the second data signal including a ranking of the candidate merchants; and (vi) generate a list of recommended merchants based on the list of candidate merchants.

Generally, the recommender computing device provides merchant recommendation to patrons of another merchant. In the example embodiment, a merchant recommendation may include a recommendation to visit a particular merchant or to visit an attraction such as a concert or other attraction. As described below, the example system and method includes capturing data identifying a patron of an input merchant (e.g., a hotel) and using other transaction data associated with the patrons of the same input merchant to generate merchant recommendations for the additional patrons of the input merchant, wherein the recommendations for the additional patrons include recommendations for the additional patron to visit or utilize services provided by at least one second merchant (e.g., the recommended merchant or a candidate merchant for possible recommendation). The input merchant or an identifier of the input merchant serves as a seed from which the recommendations are generated. The recommender computing device is configured to provide recommendations of second merchants/attractions, based on the activity of prior input merchant (e.g., seed merchant) patrons (e.g., hotel guests), directly or indirectly to a current or prospective input merchant patron.

For example, the recommender computing device automatically preforms functions typically performed by a concierge (e.g., recommending a restaurant for dinner, recommending an attraction to visit, etc.). A hotel may have a concierge desk or service with limited staff which makes receiving a recommendation from the concierge difficult for hotel patrons. And, some hotels may not have a concierge service (e.g., a motel, bed and breakfast, or other small hotel). Hotel customers at such a hotel may have difficulty finding merchants/attractions to patronize. The hotels may wish to provide recommendations but are unable to without a concierge service.

To combat these deficiencies and/or otherwise provide merchant recommendations, the recommender computing device is configured to provide a ranked list of merchants/attractions related to a specific input merchant (e.g., a hotel; motel; other short term, medium term, or long term temporary lodgings establishment; other accommodations provider; and/or other types of merchants). The recommender computing device receives transaction data from a payment processing network in a Data Acquisition Phase, described below in greater detail. The input merchant (e.g., seed merchant), for which the recommendation is generated, is identified. To provide a list of recommended local merchants/attractions to input merchant patrons (e.g., hotel guests), the recommender computing device uses transaction data of input merchant patrons (e.g., guests prior to those for which the list of recommended merchants is provided). As explained in greater detail with reference to the Cardholder Identification and Selection Phase, a subset of the signals received are identified as corresponding to transactions between candidate cardholders (e.g., hotel guests) and the input merchant. Candidate cardholders (e.g., the hotel guests) are identified by filtering the transaction data included in all the received signals to identify, based on the transaction data, that a cardholder has transacted with the input merchant (e.g., is staying at the hotel). Cardholders are selected from the candidate cardholders based on further filtering. In a Candidate Merchant Identification Phase, described in greater detail below, the recommender computing device identifies candidate merchants based on transaction data associated with the selected cardholders. In a Candidate Merchant Identification Phase, described in greater detail below, the recommender computing device identifies candidate merchants based on transaction data associated with the selected cardholders. The recommender computing device then applies filters to identify candidate merchants from the transaction data matching the selected cardholders. The recommender computing device further maintains a counter for each candidate merchant associated with the input merchant that tracks the number of transactions by selected cardholders at the candidate merchant. In a Recommendation Generation Phase described in greater detail below, the recommender computing device generates a list of recommended merchants associated with customers of the input merchant based on the identified candidate merchants. The list of recommended merchants includes at least some of the identified candidate merchants corresponding to the input merchant for which the recommendation is generated. For example, the list may be a ranked list of the candidate merchants according to the number of transactions between the candidate merchant and selected cardholders who patronized the input merchant. In a Recommendation Output Phase described in greater detail below, the recommender computing device outputs the list of recommended merchants associated with the input merchant.

Data Acquisition Phase

In a data acquisition phase, the recommender computing device receives data from a payment processing network. The recommender computing device is in communication with a payment processing network enabling a payment card system. For example, the payment processing network may be a processing network, of the type described with reference to FIG. 1, configured to process payment card transactions initiated by cardholders of payment cards. The recommender computing device includes a processor connected to a memory and communications electronics that are used to receive transaction data from the payment processing network. In one embodiment, the recommender computing device is part of the payment processing network. The recommender computing device may, for example, receive and process signals, including transaction data sent between other parties of the payment processing network such as payment card issuers and merchant banks. In another embodiment, the recommender computing device is a separate device in communication with the payment processing network such that the recommender computing device receives signals, including transaction data, and generates a ranked list of merchants based on the received signals and transaction data.

Cardholders (e.g., an entity using a payment card such as a credit card, debit card, or a prepaid card) initiate payment transaction to pay for purchases from merchants. Signals including transaction data associated with these payment transactions are received and processed over the payment processing network. The transaction data may include data identifying the cardholder and the merchant, an approximate merchant location (e.g., an address of the merchant), a timestamp associated with the transaction, a transaction amount, and/or other data.

In one embodiment, the recommender computing device acquires transaction data and stores it in one or more databases for use in generating the merchant recommendations using the systems and methods described herein. For example, the recommender computing device may maintain a database or otherwise access a database which includes transaction data for a plurality of cardholders over the course of a period of time (e.g., the prior year). Using this transaction data and the systems and methods described herein, the recommender computing device generates the list of recommended merchants. In other words, the recommender computing device may be backward looking and use historical transaction data.

In some embodiments, the recommender computing device is forward looking rather than backward looking and uses current transaction data. In further embodiments, the recommender computing device is both backward and forward looking. Current transaction data may be real time transaction data, near real time transaction data, and/or transaction data corresponding to transaction occurring within a limited prior period of time (e.g., within the last three days). Current transaction data may further include transaction data which is actively being processed and/or transmitted by one or more components or parties of the payment network such as the multi-party payment card system described with reference to FIG. 1. The recommender computing device may analyze current transaction data to identify a candidate cardholder and identify candidate merchants as described herein. For example, the recommender computing device may analyze transaction data passing through the payment network or being processed by a component of the payment network such as a payment processing computer device and/or the recommender computing device. The recommender computing device identifies (e.g., using an MCC code) an input merchant signal passing through the payment network for use in identifying a candidate cardholder. In alternative embodiments, the recommender computing device receives an input merchant identifier which the recommender computing device uses to identify candidate cardholders. The recommender computing device uses an identifier of the input merchant included in the input merchant signal as a seed to generate recommendations for the input merchant (e.g., seed merchant). This allows the recommender computing device to update and/or generate the merchant recommendations using current transaction data (e.g., in real time as transaction signals are processed by the payment network and/or transmitted between components of the payment network).

Cardholder Identification and Selection Phase

In a cardholder identification and selection phase, the recommender computing device identifies a candidate cardholder as a customer of the input merchant for which the associated list of recommended merchants is generated. Identified candidate cardholders are filtered to select cardholders from the candidate cardholders. Selected cardholders are used in further phases to generate the list of recommended merchants using, in part, transaction data associated with the selected cardholders.

The recommender computing device receives an identification of the input merchant (e.g., seed merchant). For example, the recommender computing device may receive identifying information of the input merchant from a client device. The identification of the input merchant may occur at an enrollment step in which the input merchant is identified and a user participates in a recommendation generation program carried out by the recommender computing device. For example, an input merchant or agent thereof may enroll in the recommendation program to provide its customers with recommendations. In some embodiments, the input merchant is identified at other times and/or by other parties. For example, a user, such as a cardholder or merchant patron, may identify an input merchant (e.g., a hotel) which the cardholder is patronizing or may patronize.

In one embodiment, the input merchant is identified by providing the recommender computing device with a merchant identifier (e.g., a merchant identification number) number of the type included in transaction data. In alternative embodiments, the recommender computing device identifies the input merchant and retrieves a merchant identifier (e.g., the merchant identification number) based on information received which otherwise identifies the merchant. For example, the recommender computing device may receive a merchant name, merchant address, MCC, and/or other information. The recommender computing device uses this information to retrieve the merchant identifier by comparing this information to entries in a database linked to merchant identifications (e.g., querying a merchant identification database with the received information).

In still further embodiments, the recommender computing device generates recommendations for groups of input merchants within a particular industry. For example, the recommender computing device may generate recommendations for hotels. The recommender computing device compares the MCCs in the acquired transaction data to the MCC for the particular industry if there is a match or the two MCCs are otherwise related (e.g., one MCC is a subset of another), the identified transaction data is parsed to retrieve merchant identifiers included with the transaction data.

The recommender computing device may store the merchant identifier for the input merchant(s) in a database. The recommender computing device maintains a database of all input merchants for which the recommender computing device provides recommendations of related merchants/attractions. Each input merchant may be stored in the database as a tuple or other data structure and be stored with associated information used by the recommender computing device to generate the recommendations and/or the recommendations themselves.

A subset of the transaction signals received by the recommender computing device in the Data Acquisition Phase is identified as corresponding to transactions between candidate cardholders (e.g., hotel guests) and the input merchant. These signals are identified as input merchant signals. To identify input merchant signals, the transaction data received by the recommender computing device is analyzed by the recommender computing device to identify transaction data corresponding to a transaction with the identified input merchant. For example, all or a subset of the transaction data including the merchant identifier of the input merchant is selected and identified as an input merchant signal and corresponding transaction data. The recommender computing device may, for example, compare the merchant identifier to the transaction data received (e.g., stored in a database or received in near real time) and select transaction data which includes the merchant identifier.

For all of the identified input merchant signals and corresponding transaction data, cardholder identifiers are extracted from the transaction data as candidate cardholders. In other words, candidate cardholders (e.g., the hotel guests) are identified by filtering the transaction data included in all the received signals to identify, based on the transaction data, that a cardholder has transacted with the input merchant (e.g., is staying at the hotel). For example, all the received signals are parsed to identify transaction data which includes an identifier associated with a group of input merchants (e.g., a merchant category code (MCC) corresponding to hotels) and/or a specific input merchant (e.g., a merchant identification number, merchant name, etc.). The cardholder identifiers are stored in the database of the recommender computing device as corresponding to the input merchant to maintain a database of candidate cardholders. Cardholder identifiers may include one or more of a primary account number (PAN), payment card number, cardholder name, cardholder address, and/or other cardholder identification information.

In some embodiments, the recommender computing device only identifies a cardholder as a candidate cardholder if the transaction between the cardholder and the input merchant occurred with a predetermined time period. For example, the recommender computing device may only identify a candidate cardholder if the cardholder had a transaction with the input merchant within the past year. To make this determination, the recommender computing device identifies transactions which include the merchant identifier of the input merchant in the transaction data and determines if the timestamp included in the transaction data falls within the predetermined time period. If the timestamp included in the transaction data falls within the predetermined time period, the cardholder identifier included in the transaction data is stored in the database as a candidate cardholder and is associated with the input merchant in the database (e.g., stored as a tuple). If the timestamp included within the transaction data falls outside the predetermined time period, the transaction data is not further used.

The candidate cardholders are filtered and/or a subset of the candidate cardholders is otherwise selected. Selected cardholders are stored in a database and associated with the input merchant (e.g., stored as part of a tuple including the merchant identifier of the input merchant). A subset of the candidate cardholders is selected to increase the relevancy and/or accuracy of the merchant recommendations generated in part based on the selected candidate cardholders. For example, the input merchant may be a hotel. In such a case, candidate cardholders are selected based on indications that the candidate cardholder is or was a guest of the hotel rather than simply a cardholder living in the area who happened to have a transaction with the input merchant. This results in better recommendations for other hotel guests. For example, cardholders staying at the hotel may be provided with recommendations based on attractions/merchants visited by other hotel guests rather than cardholders living in the area and simply having a transaction with the hotel, rather than staying with at the hotel.

In one embodiment, a candidate cardholder is selected for further use in providing the recommended merchants associated with the input merchant. For example, the merchant location corresponding to the input merchant is retrieved from the corresponding transaction data as well as the cardholder identifier. If the merchant location corresponding to the input merchant (e.g., the hotel) is located more than a predetermined distance (e.g., 15 miles) from a residence of the cardholder (e.g., a modeled or known residential zip code of the cardholder), the cardholder is selected (e.g., flagged as a guest of the hotel). If not, the transaction data and/or associated transaction data of the cardholder is not further analyzed, thus preventing inadvertent identification of candidate cardholders (e.g., as hotel guests). The cardholder residence may be known or retrieved from a database of cardholder identification information by querying the database using the cardholder identifier. For example, the recommender computing device may use the PAN of a candidate cardholder to query a database storing PANs and associated cardholder addresses to retrieve the cardholder address. Similarly, the recommender computing device may retrieve the address or other location information for the input merchant by querying a database using the merchant identifier. The zip code of the candidate cardholder can further be molded based on historical transaction data associated with the candidate cardholder. For example, a modeled zip code may be assigned to a candidate cardholder based on the zip code in which the majority of the historic transactions take place. This may be identified based on the address of the merchants identified in the transaction data.

In an alternative embodiment, candidate cardholders are selected if the merchant location of the input merchant is within the predetermined distance of the residence of the cardholder. For example, recommendations for an input merchant (e.g., a restaurant) may be improved by relying on local cardholders. In still further embodiments, no filters are applied, and all candidate cardholders are selected.

The functions of the recommender computing device described herein for identifying candidate cardholders and selecting cardholders may occur serially, iteratively, or as a batch. In one embodiment, the recommender computing device analyzes transaction signals and transaction data corresponding to a single transaction at one time. The recommender computing device determines if the transaction data corresponds to an input merchant based on the merchant identifier to identify a candidate cardholder, and then for the same transaction data selects or does not select the candidate cardholder. In alternative embodiments, the recommender computing device identifies all candidate cardholders first (e.g., for a prior year of transaction data) and then selects cardholders from the identified candidate cardholders. In still further embodiments, a combination of these techniques is used. For example, transaction data may be processed for a prior year using the latter technique and then continually updated based on newly received transaction signals using the former technique.

In some alternative embodiments, the recommender computing device retrieves a first electronic data signal from a database associated with the payment processor based at least in part on the input merchant identifier. The first data signal including historical transaction data of the input merchant includes each historical payment transaction of a plurality of historical payment transactions having been initiated by candidate cardholders with the input merchant. The database may be generated by the payment processor using one or more of the techniques described herein with respect to the recommender computing device. In further embodiments, the recommender computing device receives the first electronic data signal including the historical transaction data of the input merchant identifying candidate cardholders, and the recommender computing device filters or otherwise selects candidate cardholders using one or more of the techniques described herein. The recommender computing device stores a list of candidate cardholders in memory based on the first electronic data signal. The stored list may correspond to selected candidate cardholders.

Candidate Merchant Identification Phases

In a Candidate Merchant Identification Phase, the recommender computing device identifies candidate merchants based on transaction data associated with the selected cardholders. The recommender computing device uses the cardholder identifiers of the selected cardholders to identify further transactions between the selected cardholders and merchants other than the input merchant (e.g., by comparing the cardholder identifiers to transaction data stored in a database of the recommender computing device). The recommender computing device then applies filters to identify candidate merchants from the transaction data matching the selected cardholders. For merchant transactions meeting the filter criteria, the candidate merchant is stored in the database of the recommender computing device and is associated with the input merchant. For each candidate merchant, the recommender computing device maintains a counter of the number of transactions by selected cardholders at the candidate merchants.

Once a cardholder is selected as an input merchant patron (e.g., hotel guest), the signals and corresponding transaction data of the identified cardholder are analyzed to identify transactions associated with candidate merchants who may be recommended to other patrons of the input merchant. The recommender computing device uses the cardholder identifier of the selected cardholder to identify further transactions made by the selected cardholder. For example, the recommender computing device queries the database of transaction data using the cardholder identifier and retrieves all transaction data including matching cardholder identifiers.

The recommender computing device filters the transactions made by the selected cardholder to identify candidate merchants. For example, the recommender computing device excludes transaction data corresponding to transactions with the input merchant. This transaction data is excluded by the MR computing by comparing the merchant identifier of the input merchant to the transaction data and removing transaction data including a matching merchant identifier. In some embodiments, the recommender computing device further filters the transaction data based on time, location, merchant type, and/or other factors. For example, transaction data including a timestamp which falls outside a predetermined time period from the transaction with the input merchant may be excluded. Similarly, transaction data including a merchant located more than a predetermine distance from the input merchant may be excluded. The locations of the merchant and input merchant may be determined based on the merchant identifiers, address or other location data included in the transaction data, and/or otherwise determined. In further embodiments, the transaction data may be filtered to exclude merchants of a type other than the input merchant. For example, the input merchant may be a restaurant and so only restaurant candidate merchants are identified. This increases the relevancy of the recommendation generated by the recommender computing device. The recommender computing device may use MCCs and/or other information to exclude transaction data having merchants of a type other than the input merchant. For example, the recommender computing device may compare an MCC of the input merchant to MCCs of the transaction data associated with the selected cardholder and exclude transaction data having MCCs which do not match that of the input merchant.

In some cases, the input merchant may be a hotel or similar merchant. In such a case, the recommender computing device may filer the transaction data of the selected cardholder to identify candidate merchants associated with the selected cardholder's stay in the hotel. For example, the transaction data of the selected cardholder corresponding to merchants other than the input merchant are analyzed to determine which transactions are associated with a cardholder's stay in a hotel and with candidate merchants. Transaction data which includes merchants located in the same zip code of the hotel and/or within a predefined distance from the hotel may be identified as associated with the cardholder's stay in the hotel. This may be determined by comparing location data (e.g., addresses, zip codes, or the like) included in the transaction data identifying the candidate merchant with location data known for the input merchant (e.g., retrieved from transaction data identifying the input merchant or from a third party). Transaction data which does not include a "card present" flag or identifier may be filtered out to prevent inadvertent identification of online purchases as being associated with the cardholder's stay in the hotel.

Transaction data may be further filtered based on the timing of the transaction. The recommender computing device may determine that a first transaction of the selected cardholder occurred outside the selected cardholder's trade area. For example, the recommender computing device may determine that the transaction data identifies a merchant having a location more than a predetermined distance (e.g., 20 miles) from the residence or modeled zip code of the selected cardholder. The recommender computing device identifies this transaction and the associated timestamp included in the transaction data as the beginning of the cardholder's travel. The recommender computing device further identifies the end of the cardholder's travel by identifying transaction data including a merchant located within the cardholder's trade area and having a timestamp after and closest to the timestamp identifying the beginning of the cardholder's travel. The recommender computing device may define the difference in the time stamps corresponding to the beginning and end of the cardholder's travel as a travel window. The recommender computing device filters out transaction data corresponding to transactions occurring outside the travel window by comparing the timestamps of the transactions to the travel window and excluding transaction data not having timestamps which fall within the travel window.

Transactions identified as corresponding to the selected cardholder's patronage of the input merchant (e.g., the hotel) and including candidate merchants which are not filtered out are parsed and stored in a database, the database associated with the input merchant and including information such as the name of the candidate merchant or identifier of the candidate merchant. The recommender computing device may further add to the database additional information including the timestamp of the transaction, date of the transaction, MCC, transaction amount, and/or other information retrieved from the transaction data. The recommender computing device maintains database entries of the identified candidate merchants and corresponding transaction data and associates these entries with the input merchant.

Additional categorization information may be added to the database entry for each candidate merchant and/or otherwise stored in the database and associated with the candidate merchant. For example, each candidate merchant may be identified as falling within a restaurant category, an entertainment category, an attraction category, a shopping category, and/or other categories. Categorization may be based on an MCC, industry code, retail industry code, and/or other information included in the transaction data which the recommender computing device retrieves from the transaction data and stores in the database as an entry associated with the candidate merchant. The recommender computing device may further categorize candidate merchants based on information retrieved from a separate database maintained by the recommender computing device. For example, the recommender computing device may maintain or otherwise have access to a database of merchant identifiers and associated merchant categorization information. The merchant categorization information may include additional information not typically included in transaction data. For example, the merchant categorization information included in the database may include information such as a restaurant type of a merchant or cuisine type served by a restaurant merchant, price categorization information (e.g., based on an average transaction amount for the merchant), and/or other information. The recommender computing device may query the database based on information included in the transaction data such as a merchant identifier and retrieve the categorization information. The categorization information is stored in the database of input merchant recommendations as an entry corresponding to the candidate merchant.

In some embodiments, candidate merchants may be further categorized based on additional information included in the transaction data and/or retrieved from another database (e.g., a third party database). For example, candidate merchants categorized in the restaurant category may be further categorized as breakfast, lunch, and/or dinner establishments based on the transaction time stamps included in the transaction data. In some embodiments, the recommender computing device compares timestamps of transaction data to time windows which define breakfast, lunch, and dinner (e.g., 6 AM to 10 AM, 10 AM to 3 PM, and 3 PM to 10 PM, respectively). The transaction is identified as corresponding to breakfast, lunch, or dinner depending on which time window the timestamp falls into. Based on the categorization of transactions for a specific candidate merchant, the recommender computing device determines if the candidate merchant is a breakfast, lunch, and/or dinner establishment. For example, if the percentage of transactions in one time window exceeds a predetermined threshold (e.g., 33 percent, 50 percent, 75 percent, etc.), the candidate merchant is categorized according to that time window.

In some embodiments, a restaurant candidate merchant may be categorized as serving a specific cuisine type (e.g., American, Italian, Indian, French, etc.) using a third party database of the type previously described. For example, a restaurant candidate merchant may be categorized as serving a specific cuisine type by correlating a merchant identifier of the candidate merchant (e.g., a merchant identification number) and/or other merchant identification information (e.g., a merchant name, address, etc.) with information included in an additional database (e.g., a third party database) which includes merchant identification information and corresponding cuisine type information. The recommender computing device queries the database using the merchant identification information and receives cuisine type information corresponding to merchant identification information which matches the query. The recommender computing device stores the cuisine type information in the database and associates the cuisine type information with the candidate merchant identifier and/or other identification information submitted to the third party database in the query.

The database of recommendations for input merchants is populated based on transactions of multiple cardholders using the techniques described above. A plurality of additional candidate merchants is added to the database based on the transaction data of the plurality of cardholders and according to the techniques described above. For each input merchant, candidate merchants and the associated information are added to the database when candidate merchants are identified using the above described techniques. In some embodiments, each time a candidate merchant is identified they are serially added to the database for the input merchant (e.g., added as an additional entry), including duplicates of the same candidate merchant identified using different transaction data (e.g., identified through multiple different transactions with the same candidate merchant). Alternatively, once a candidate merchant has been added to the database corresponding to a particular input merchant, subsequent identifications of the same candidate merchant cause the recommender computing device to add 1 to a counter value for that candidate merchant stored in the database and associated with the input merchant. This generates a database of the number of transactions associated with each candidate merchant identified as patronized by customers of the input merchant (e.g., the hotel guests). In some embodiments, all cardholders having a transaction within the past year at the input merchant are identified and their transaction data is analyzed as explained herein to identify candidate merchants patronized (e.g., during their stay at a hotel input merchant).

In some alternative embodiments, the recommender computing device retrieves a second electronic data signal from the payment processor database. The second data signal includes historical transaction data for each candidate cardholder included in the list of candidate cardholders, and the historical transaction data for each candidate cardholder includes a candidate merchant identifier for each transaction that identifies the candidate merchant involved in each of said transactions. The database may be generated by the payment processor using one or more of the techniques described herein with respect to the recommender computing device. In further embodiments, the recommender computing device receives the second electronic data signal including the historical transaction data for each candidate cardholder identifying candidate merchants, and the recommender computing device filters or otherwise selects candidate merchants using one or more of the techniques described herein.

Recommendation Generation Phase

In a Recommendation Generation Phase, the recommender computing device generates a list of recommended merchants associated with customers of the input merchant based on the identified candidate merchants. The list of recommended merchants includes at least some of the identified candidate merchants corresponding to the input merchant for which the recommendation is generated.

Using the candidate merchant information stored in the database and associated with the input merchant, the recommender computing device generates a ranked list including at least a subset of the candidate merchants patronized by customers of the input merchant, the selected cardholders (e.g., prior guests of a hotel input merchant). The ranked list is the set of recommended merchants corresponding to the input merchant. The ranked list is stored in memory for distribution and may be updated periodically (e.g., weekly, monthly, etc.) with additional transaction data stored in the database and periodically received or made available to the recommender computing device. The ranked list may list recommended merchants (e.g., a subset of the candidate merchants) in descending order based on a total number of transactions at each candidate merchant by customers of the input merchant, the selected cardholders (e.g., the hotel guests). The ranked list may cut off the number of candidate merchants listed as recommended merchants above a threshold number (e.g., 10), the recommender computing device may only include candidate merchants as recommended merchants if the corresponding counter value is above a threshold number (e.g., 10), and/or the ranked list may otherwise only include a subset of the candidate merchants.

In some embodiments, different lists may be provided or one ranked list filtered by one or more criteria (e.g., filter options). For example, the ranked list may display candidate merchants ranked by total number of transactions occurring within a particular time window (e.g., between 7 AM and 10 AM, between LOAM and 2 PM, between 2 PM and 10 PM, etc.) based on transaction time stamps stored in the database and corresponding to both the candidate merchants and the input merchant. The ranked list may display candidate merchants ranked by total number of transactions occurring within a particular season (e.g., between the months of December through February, between the months of March through May, between the months of June through August, or between the months of September through November) based on transaction dates stored in the database and corresponding to both the candidate merchants and the input merchant. The ranked list may display candidate merchants of only one category type (e.g., a restaurant category). The ranked list may include further filtering or categorization (e.g., by cuisine type). In some embodiments, additional information about each candidate merchant is provided in the list. For example, average transaction amount information for each merchant may be used to assign a cost indication to each merchant that is displayed in the ranked list.

In generating the ranked list of recommended merchants, the recommender computing device uses identified candidate merchants and associated information stored in the database and associated with the input merchant in the Candidate Merchant Identification Phase. The recommender computing device generates the merchant recommendation for an input merchant by creating a ranked list of candidate merchants based on the number of transactions corresponding to each candidate merchant. For example, the recommender computing device may read the candidate merchant counter value associated with each candidate merchant identified for an input merchant. Based on the counter values, the recommender computing device orders the corresponding candidate merchants in descending order of counter values. For example, the recommender computing device may use a sorting algorithm such as bucket sort, counting sort, radix sort, or other sorting algorithms.

The recommender computing device may provide the ranked list in its entirety, provide a subset of the ranked list, or filter the ranked list. In some embodiments, the recommender computing device shortens the ranked list by excluding one or more candidates from the ranked list based on their ranking position and/or based on their corresponding counter values. For example, the recommender computing device may shorten the ranked list by excluding all candidate merchants ranked higher than ten with a rank of one corresponding to the highest counter value or otherwise corresponding to the most associated transactions. In some embodiments, the recommender computing device excludes all candidate merchants from the rank list which have a counter value or number of associated transactions below a predetermined threshold value (e.g., 2, 10, 50, etc.).

The recommender computing device may also filter the ranked list. The recommender computing device may filter the ranked list based on filer options received at the recommender computing device from a user device or client system which requests the merchant recommendations for the input merchant. In some embodiments, the recommender computing device may generate several ranked lists for each input merchant using different predetermined filter options and store the ranked lists in the database. This may allow the recommender computing device to provide merchant recommendations in response to a request faster than if the recommender computing device were to filter each ranked list every time a request for merchant recommendations is received. The recommender computing device filters the ranked list by comparing filter options to the transaction data, aggregated transaction data, and/or candidate merchant categorization corresponding to each candidate merchant and stored in the database. For example, the recommender computing device may filter the ranked list based on transaction occurring with a particular time window. To do so, the recommender computing device may compare a timestamp for each transaction with the candidate merchants to the time window and exclude those transactions which do not fall within the time window. The remaining transactions are counted for each candidate merchant to which they correspond and the ranked list is generated based on the number of filtered transactions associated with each candidate merchant. The transaction data corresponding to each transaction associated with the candidate merchants may be used to filter the ranked list based on other criteria or filter options using similar techniques. The ranked list may also be filtered based on aggregate transaction data or a categorization of the candidate merchants. For example, the ranked list may be generated only for candidate merchants which are restaurants (e.g., to provide recommendations for restaurant merchants associated with a particular input merchant such as a hotel). The recommender computing device may remove candidate merchants from the ranked list which are not categorized in a category matching the filter options (e.g., a restaurant category). For example, the recommender computing device compares a categorization of the candidate merchant (e.g., an MCC code, cuisine type retrieved from a third party database, or other category) to the filter option and excludes those candidate merchants which do not have a matching categorization.

The merchant recommendation is secure and anonymized in that the merchant recommendation does not identify the cardholders from the transaction data used to generate the merchant recommendation. The cardholder identifiers used remain in the database of the recommender computing device and are not transmitted to parties requesting or otherwise receiving the merchant recommendations. Furthermore, cardholders are not required to input information into the recommender computing device or otherwise provide information regarding candidate merchants. Rather, the recommender computing device generates the merchant recommendations automatically from the transaction data as described herein. For example a cardholder or input merchant customer need not provide information specifying candidate merchant which the customer has patronized as this information is retrieved automatically from the transaction data of the customer.

Recommendation Output Phase

In a recommendation output phase, the recommender computing device outputs the list of recommended merchants associated with the input merchant generated in the Recommendation Generation Phase. In some embodiments, the Recommendation Output Phase is triggered by a request from a user or client system received at the recommender computing device. The request may include filter options, an identification of the input merchant, and/or other information. The information included in the request may be used, in part, to generate the merchant recommendations during the Recommendation Generation Phase. The Recommendation Output Phase and the Recommendation Generation Phase may be carried out concurrently, in whole or in part, by the recommender computing device. For example, the recommender computing device may use filter options received in a request for recommendations during the Recommendation Output Phase in the Recommendation Generation Phase.

In some embodiments, the Recommendation Output Phase occurs periodically. The recommender computing device may output the merchant recommendation on a fixed schedule. For example, the recommender computing device may output merchant recommendations every month, every quarter, every year, and/or on other period cycles. This allows for the recommender computing device to update merchant recommendations for one or more input merchants based on additional transaction signals and/or transaction data received between periods of the fixed schedule. As previously explained, in some cases the recommender computing device uses transaction data from a fixed prior period (e.g., the prior year) to generate merchant recommendations for an input merchant. This in combination with the fixed output schedule (or in combination with recommendations output in response to a request) provides recommendations based on up to date information.

The recommender computing device provides the ranked list, generated in the Recommendation Generation Phase, directly or indirectly to patrons of the input merchant (e.g., hotel guests) and/or prospective patrons of the input merchant (e.g., users booking a hotel). The recommender computing device may provide the ranked list directly to the input merchant (e.g., the hotel) for which the ranked list corresponds, the input merchant may in turn provide the list to customers (e.g., hotel guests). The recommender computing device may provide one or more ranked lists to a merchant bank which may provide the ranked list to merchant customers as an added service, an input merchant (e.g., hotel) customer of the merchant bank may in turn provide the list to its customers. Additionally, the recommender computing device may provide ranked lists to an issuing bank which in turn provides ranked lists to cardholders as a value added service. In still further embodiments, the recommender computing device provides ranked lists to third parties which facilitate transactions with input merchants. For example, the recommender computing device may provide ranked lists to third party hotel booking services. In one embodiment, the recommender computing device provides ranked lists directly to input merchant customers (e.g., hotel guests), potential input merchant customers, or other end users directly through an application running on a user device and in communication with the recommender computing device.

In providing the merchant recommendation to one or more parties, the recommender computing device utilizes a network connection to a client system or user device of the parties to whom the recommendation is provided. A communication interface allows the recommender computing device to receive requests for merchant recommendations and to output the merchant recommendations electronically and via a network. In some embodiments, the recommender computing device outputs the merchant recommendations and/or receives requests for merchant recommendations via a website served by the recommender computing device. In further embodiments, a user device or client system may run an application. The application sends merchant recommendation requests and/or other information (e.g., filter options) to the recommender computing device via a network and/or receives the merchant recommendations from the recommender computing device. For example, the recommender computing device may transmit information and/or instructions to the user device or client system which are formatted to cause the application to display or otherwise make available the merchant recommendations.

In some embodiments, the recommender computing device stores pre-filtered ranked lists, generated in the Recommendation Generation Phase, in the database associated with the input merchant and associate each pre-filtered list with the filter options used in generating the pre-filtered list. Upon receiving a request for merchant recommendations with specific filter options, the filter options are used to query the database associated with the input merchant identified in the request. The recommender computing device returns the ranked list having the same filter options identified in the merchant recommendation request.

The technical effects of the systems and methods described herein can be achieved by performing at least one of the following steps: (i) receiving, by the recommender computing device, an input merchant identifier, the input merchant identifier for identifying the input merchant; (ii) retrieving, by the recommender computing device, a first electronic data signal from a database associated with the payment processor based at least in part on the input merchant identifier, the first data signal including historical transaction data of the input merchant including each historical payment transaction of a plurality of historical payment transactions having been initiated by candidate cardholders with the input merchant; (iii) storing a list of the candidate cardholders in the memory from the first electronic data signal; (iv) retrieving, by the recommender computing device, a second electronic data signal from the payment processor database, the second data signal including historical transaction data for each candidate cardholder included in the list of candidate cardholders, the historical transaction data for each candidate cardholder including a candidate merchant identifier for each transaction that identifies the candidate merchant involved in each of said transactions; (v) generating a list of candidate merchants from the second data signal including a ranking of the candidate merchants; and (vi) generating a list of recommended merchants based on the list of candidate merchants. As described herein, the technical effects of the systems and methods described herein include, at least, automatically generating merchant recommendations by processing received transaction signals using a recommender computing device (e.g., a specialized computing device for receiving and processing transaction data used in a payment processing network). The recommendation is also secure and anonymized in that the recommendation does not identify cardholders on which the data is based and does not require input from cardholders.

The following detailed description of the embodiments of the disclosure refers to the accompanying drawings. The same reference numbers in different drawings may identify the same or similar elements. Also, the following detailed description does not limit the claims.

Described herein are computer systems such as recommender computing devices and user computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features. Also, as used herein, the term "each" may include each element described or may refer to at least one of said elements described.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

In the example embodiment, in situations in which the systems discussed herein collect personal information about users, or may make use of personal information, the users may be provided with an opportunity to control whether programs or features collect user information (e.g., certain payment transaction data, information about a user's social network, social actions or activities, profession, a user's preferences, or a user's current location), or to control whether and/or how to receive content from the recommender computer device. Enrollment can be carried out in a variety of ways; for example, through a web interface; via an app store; or via a credit account issuer or other financial institution. There may be some payment data that will not be shared even if the consumer does consent; for example, health care transactions. The system might deem it to be against policy or otherwise inappropriate. The consumer may be afforded many options but some may be restricted for legal or policy reasons or the like. Stated in another way, there is preferably no sharing without the consumer's consent, and some data may not be appropriate to share even with the consumer's consent. Appropriate usage limits are preferably placed on use of the published data. Appropriate age limits are preferably enforced on those enrolling. Of course, all applicable laws, rules, regulations, policies and procedures with respect to age of consumers, privacy, and the like will always be fully complied with.

In addition, certain data may be treated in one or more ways before it is stored or used, so that personally identifiable information is removed. For example, a user's identity may be treated so that no personally identifiable information can be determined for the user, or a user's geographic location may be generalized where location data is obtained (such as to a city, ZIP code, or state level), so that a particular location of a user cannot be determined. Thus, the user may have control over how information is collected about the user and used by a content server.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the generation and communication (e.g., display) of merchant recommendations.

FIG. 1 is a schematic diagram illustrating an example multi-party payment card system 20 for enabling payment-by-card transactions and communicating merchant recommendations for an input merchant, in accordance with one embodiment of the present disclosure. FIG. 1 depicts a flow of data in a typical financial transaction through system 20, which includes a recommender computing device 112. Components of system 20 provide recommender computing device 112 with transaction data, which recommender computing device 112 processes to generate merchant recommendation and provide the recommendations to one or more parties.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information and/or transaction information such as a type of merchant, amount of purchase, date of purchase, and/or other information in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including recommender computing device 112. In the example embodiment, interchange network 28 provides such transaction data and additional transaction data. In alternative embodiments, any party may provide such data to recommender computing device 112.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, recommender computing device 112 may be used to generate and communicate merchant recommendations. Although the systems described herein are not intended to be limited to facilitate such applications, the systems are described as such for exemplary purposes.

Figure 2:
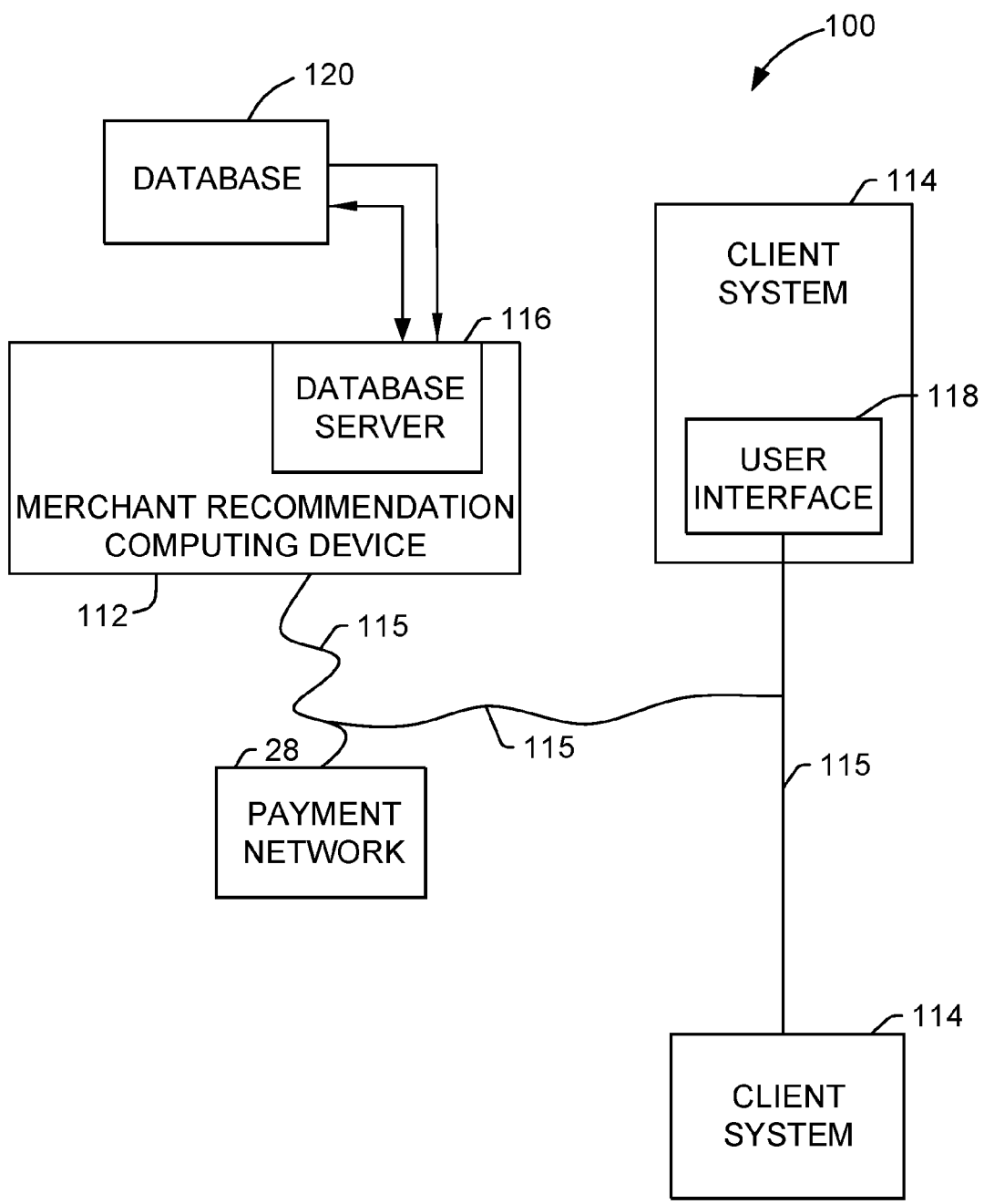

FIG. 2 is an expanded block diagram of an example embodiment of a computer system 100 used in processing payment transactions that includes recommender computing device 112 in accordance with one example embodiment of the present disclosure. In the example embodiment, system 100 is used for generating merchant recommendations and providing said merchant recommendation to one or more parties, as described herein.

More specifically, in the example embodiment, system 100 includes a recommender computing device 112, and a plurality of client sub-systems, also referred to as client systems 114, connected to recommender computing device 112. In one embodiment, client systems 114 are computers including a web browser, such that recommender computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store data. Recommender computing device 112 is also in communication with payment network 28 using network 115. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on recommender computing device 112 and can be accessed by potential users at one of client systems 114 by logging onto recommender computing device 112 through one of client systems 114. Alternatively, recommender computing device 112 serves data included in database 120 to client systems 114 (e.g., in response to a request from a client system 114). In an alternative embodiment, database 120 is stored remotely from recommender computing device 112 and may be non-centralized. Database 120 may be a database configured to store information used by recommender computing device 112 including, for example, transaction data, input merchant identifiers, candidate cardholder identifiers, candidate merchant identifiers, candidate merchant transaction counters, candidate merchant categorizations, and/or other information described herein.

Database 120 may include a single database having separated sections or partitions, or may include multiple databases, each being separate from each other. Database 120 may store transaction data generated over the processing network including data relating to merchants, consumers, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with one of acquirer bank 26 (shown in FIG. 1) and issuer bank 30 (also shown in FIG. 1). For example, one of client systems 114 may be a POS device. Client systems 114 may additionally or alternatively be associated with a user (e.g., an input merchant, a cardholder, a merchant bank 26, issuer bank 30, candidate merchant, or third party recommendation service). In the example embodiment, one of client systems 114 includes a user interface 118. For example, user interface 118 may include a graphical user interface with interactive functionality, such that merchant recommendations, transmitted from recommender computing device 112 to client system 114, may be shown in a graphical format. A user of client system 114 may interact with user interface 118 to view, explore, and otherwise interact with the merchant recommendations. Recommender computing device 112 may be associated with interchange network 28 and/or may process transaction data.

Figure 3:
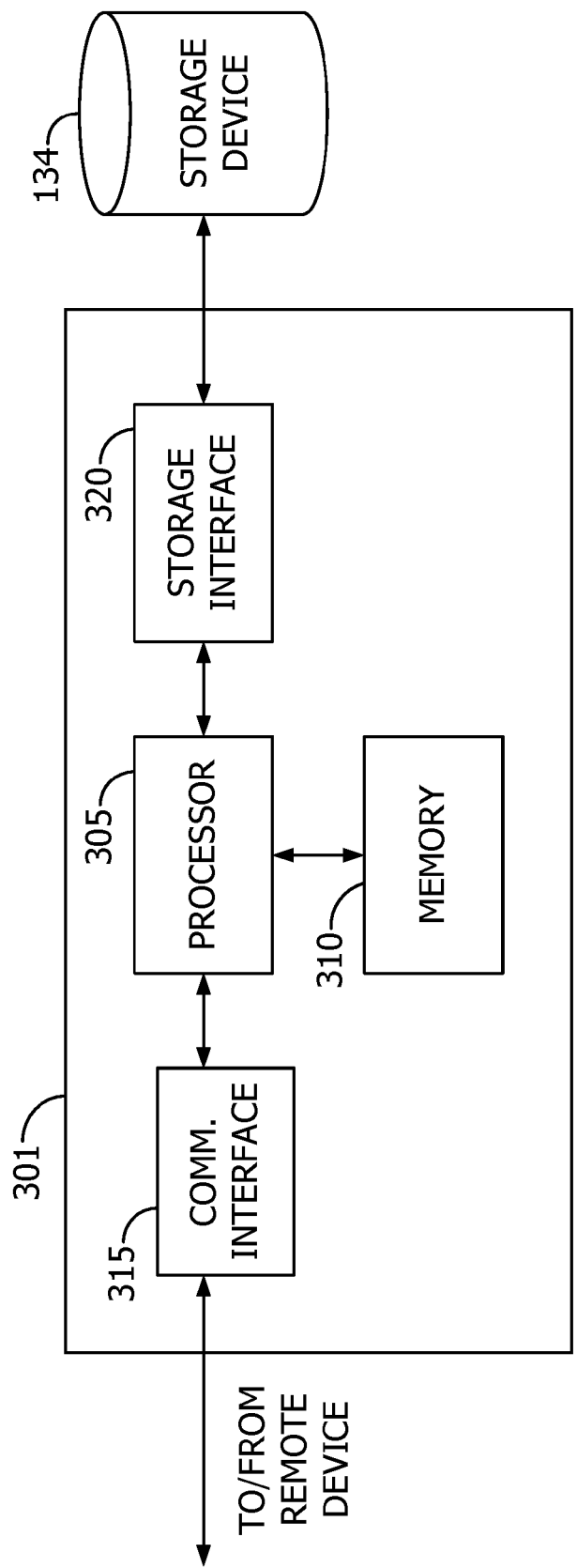

FIG. 3 illustrates an example configuration of a server system 301 such as recommender computing device 112 (shown in FIGS. 2 and 3) used to generate merchant recommendations and present said recommendations on an interactive user interface, in accordance with one example embodiment of the present disclosure. Server system 301 may also include, but is not limited to, database server 116. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests (e.g., requests to display merchant recommendations and/or provide an interactive user interface) from a client system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
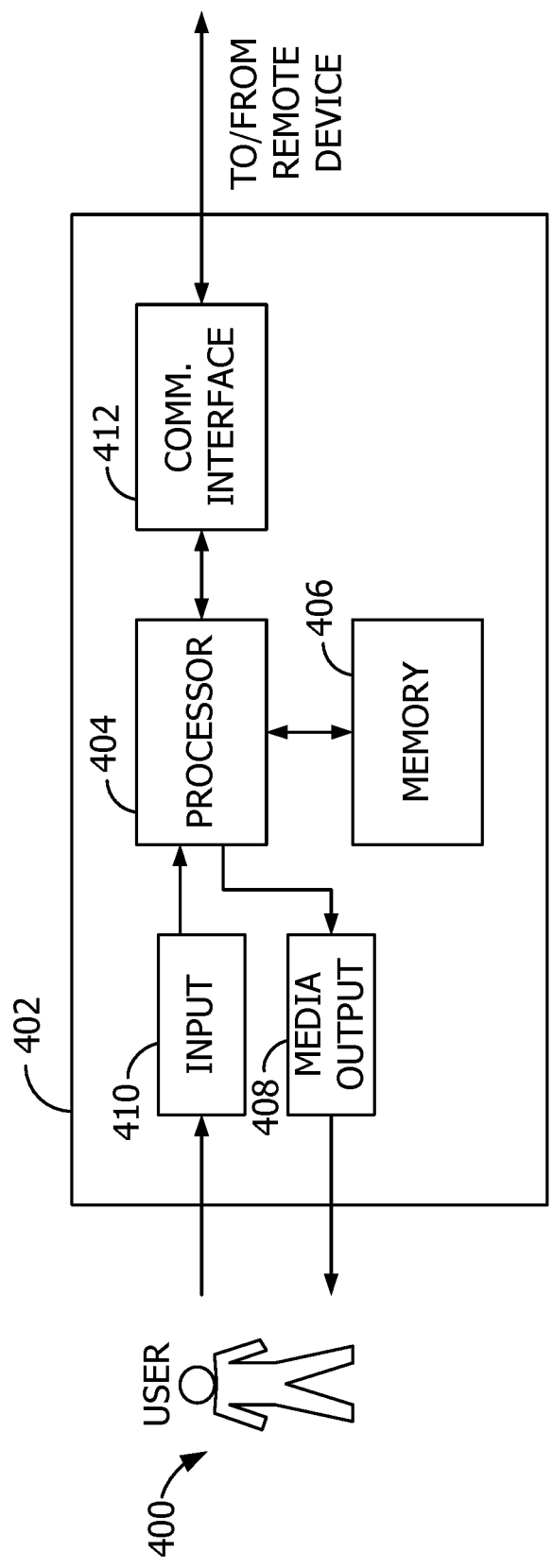

FIG. 4 illustrates an example configuration of a client computing device 402. Client computing device 402 may include, but is not limited to, client systems ("client computing devices") 114. Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400 (e.g., a cardholder 22). Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 302 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 406 are, for example, computer-readable instructions for providing a user interface to user 400 via media output component 408 and, optionally, receiving and processing input from input device 410. A user interface may include, among other possibilities, a web browser and client application. Web browsers enable users 400 to display and interact with media and other information typically embedded on a web page or a website from a web server associated with a merchant. A client application allows users 400 to interact with a server application associated with, for example, a merchant. The user interface, via one or both of a web browser and a client application, facilitates display of generated merchant recommendations by recommender computing device 112. The user may interact with the user interface to view and explore the merchant recommendations, for example, by selecting an input merchant of interest using input device 410 and viewing recommendation associated with that input merchant.

Figure 5:
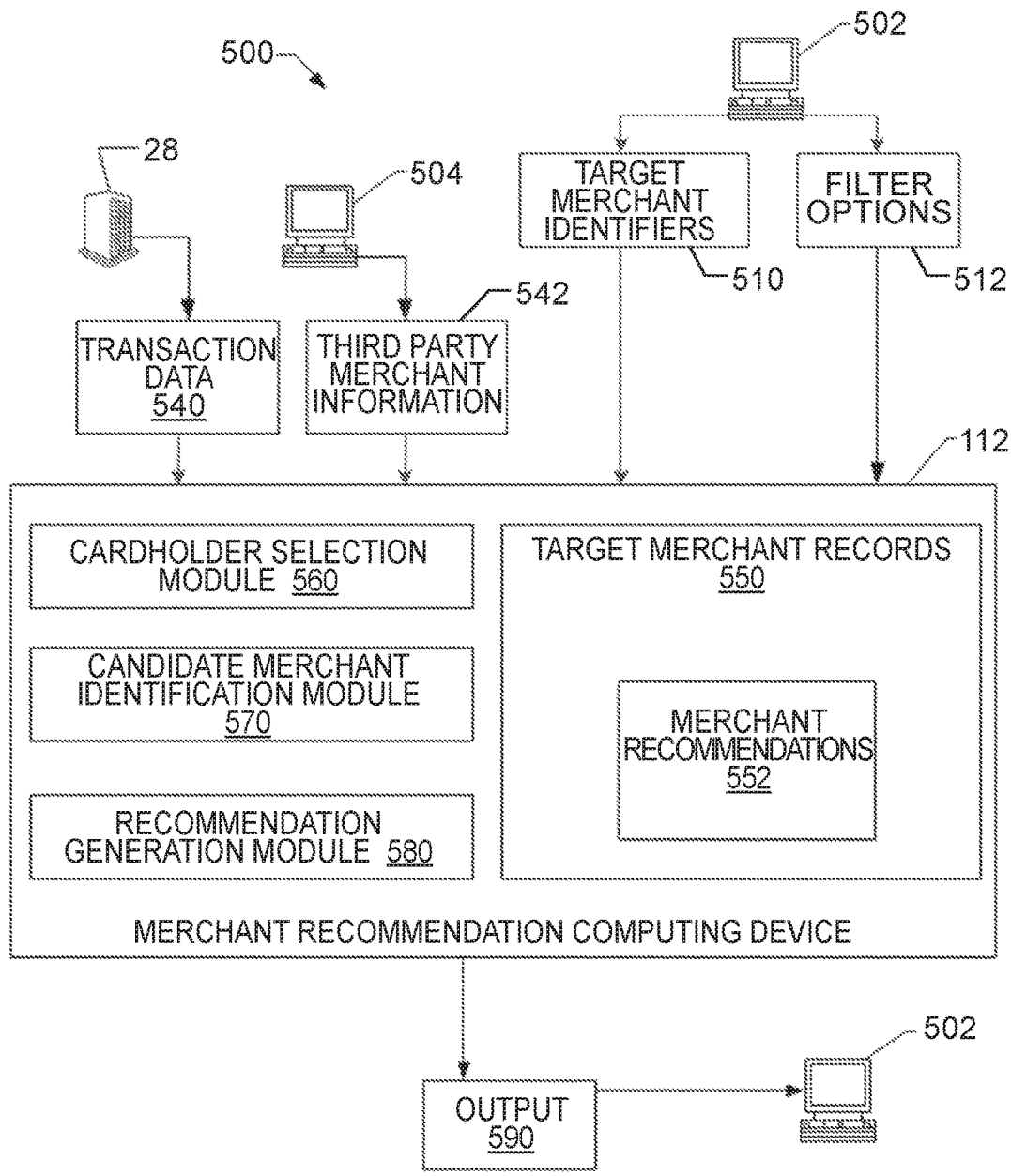

FIG. 5 is a simplified data flow diagram for generating merchant recommendations and outputting the merchant recommendations using recommender computing device 112. As described herein, recommender computing device 112 receives transaction data 540 from interchange network 28 during a Data Acquisition Phase. Recommender computing device 112 can identify transactions involving input merchants be analyzing the received transaction data 540. For example, recommender computing device 112 mat compare an MCC code in transaction data 540 for each transaction to an MCC code which identifies the type of input merchants (e.g., hotels) for which recommendation are generated. Recommender computing device 112 extracts a merchant identifier from the transaction data upon determining that the transaction data includes a matching MCC code and stores the merchant identifier in input merchant records 550 as identifying an input merchant. In this way, recommender computing device 112 can identify input merchants for which to generate recommendations. In some embodiments, recommender computing device 112 identifies transactions as corresponding to an input merchant by comparing the merchant identifiers stores in input merchant records 550 to the merchant identifier included in the received transaction data 540.

In some embodiments, recommender computing device 112 receives input merchant identifiers 510 from a user device 502. For example, a user such as a cardholder, input merchant, third party recommendation service, issuer bank, merchant bank, and/or other user can provide input merchant identifiers 510 to recommender computing device 112 using user device 502. Input merchant identifiers 510 may be received along with a request for merchant recommendations (e.g., in the case of a cardholder user), may be received as an input merchant enrolls in a recommendation program, or may otherwise be received. Recommender computing device 112 stores the received input merchant identifiers 510 in input merchant records 550 (e.g., in a database). Recommender computing device 112 compares the input merchant identifiers 510 received from user device 502 and stored in input merchant records 550 to the transaction data 540 to identify transaction with the input merchant. Recommender computing device 112 may perform these functions and/or those described with reference to the Data Acquisition Phase using the algorithmic steps described and/or additional algorithms as executed by a data acquisition module and/or other program(s) or functions stored in memory of the recommender computing device 112.

For each transaction identified as a transaction with an input merchant, recommender computing device 112 retrieves from the corresponding transaction data 540 a cardholder identifier during a Cardholder Identification and Selection Phase. Recommender computing device 112 further selects cardholders from the identified cardholders (e.g., candidate cardholders) by filtering the candidate cardholders or otherwise determining if the candidate cardholders identified meet predetermined criteria. Recommender computing device 112 may perform these functions and/or those described with reference to the Cardholder Identification and Selection Phase using the algorithmic steps described and/or additional algorithms as executed by a cardholder selection module 560 and/or other program(s) or functions stored in memory of the recommender computing device 112.

The cardholder identifiers parsed from transaction data identified as a transaction with an input merchant are stored in database as entries of candidate cardholders. For example, recommender computing device 112 may store the cardholder identifiers in input merchant records 550 as entries associated with a specific input merchant. Using the transaction data 540 associated with the candidate cardholder and input merchant, the recommender computing device 112 selects cardholders from the database of candidate cardholders. For example, the recommender computing device 112 may select candidate cardholders associated with transaction data having a timestamp within the past year. The recommender computing device 112 compares a current time value with the time values of the time stamps stored in the transaction data in input merchant records 550 and associate with each candidate cardholder. Transaction data identified which has a timestamp falling within the past year causes the recommender computing device 112 to parse the transaction data and select the candidate cardholder's cardholder identifier for further use in generating the recommendation.

In further embodiments, other filter or selection criteria may be used by the recommender computing device 112 to select from the candidate cardholders associated with an input merchant. For example, the input merchant may be a hotel, and recommender computing device 112 selects candidate cardholders having a known or modeled zip code or other location information which indicates that the cardholder's residence is more than a predetermined distance from the hotel input merchant. The recommender computing device 112 may, for each candidate cardholder, compare location data for the candidate cardholder (e.g., retrieved from a database of cardholder information using the cardholder identifier) to location information for the input merchant (e.g., retrieved from the transaction data or retrieved from a database of merchant information using the input merchant identifier). If the difference is more than a predetermined amount (e.g., 15 miles), the recommender computing device 112 selects the candidate cardholder.

The selected candidate cardholders (e.g., the associated cardholder identifiers) are stored in a database (e.g., input merchant records 550) by the recommender computing device 112 and are associated with the corresponding input merchant.

Using the selected candidate cardholders and the associated cardholder identifiers, the recommender computing device 112 identifies candidate merchants, from which the merchant recommendations are generated, during a Merchant Identification Phase. The recommender computing device 112 compares the cardholder identifiers of the selected cardholders to cardholder identifiers included in the transaction data 540 and identifies matches. The recommender computing device 112 parses the matched transaction data to retrieve at least the merchant identifier and stores the merchant identifier in a database (e.g., input merchant records 550) as a candidate merchant associated with the input merchant. The recommender computing device 112 may filter the transaction data or otherwise select candidate merchants meeting predetermined criteria by comparing the transaction data identified as matching the selected cardholder identifiers to the filter or predetermined criteria. The recommender computing device 112 may also categorize an identified candidate merchant based on associated transaction data, an additional database of merchant categorizations, and/or other information. The recommender computing device 112 may perform these functions and/or those described with reference to the Candidate Merchant Identification Phase using the algorithmic steps described and/or additional algorithms as executed by a candidate merchant identification module 570 and/or other program(s) or functions stored in memory of the recommender computing device.

Recommender computing device 112 can apply one or more filters or identification criteria in identifying candidate merchants from the transaction data identified as corresponding to selected cardholders. Recommender computing device 112 may exclude a candidate merchant when the transaction data corresponding to the transaction between the selected cardholder and the possible candidate merchant has a timestamp value failing outside a particular predetermined time window. For example, the recommender computing device 112 compares the timestamp value to a current time value and determines if the difference is greater than predetermined amount (e.g., 1 year). If the difference is greater, the recommender computing device 112 does not identify the possible candidate merchant as a candidate merchant. If the difference is less than the predetermined amount, the recommender computing device 112 identifies the merchant as a candidate merchant.

In some embodiments, the recommender computing device 112 does not identify a merchant as a candidate merchant if the merchant is the input merchant. The recommender computing device 112 may compare the merchant identifier from the transaction data to the merchant identifier of the input merchant stored in the database (e.g., input merchant records 550). If there is a match, the recommender computing device 112 does not identify the merchant as a candidate merchant. As a result, the transaction data used to identify candidate merchants is second transaction data which is distinct from the first transaction data used to identify and select cardholders. The first transaction data is transaction data which corresponds to a transaction between a cardholder and the input merchant. The second transaction data is transaction data which corresponds to a transaction between a selected cardholder and a merchant other than the input merchant.

In some embodiments, the recommender computing device 112 uses candidate merchant identification criteria which require that the transaction between the selected cardholder and the merchant be a card present transaction in order for the merchant to be identified as a candidate merchant. The recommender computing device 112 analyzes the transaction data associated with the selected cardholder and possible candidate merchant to determine if a card present transaction flag is present in the transaction data. If the flag is present, the recommender computing device 112 identifies the merchant as a candidate merchant.

In some embodiments, the recommender computing device 112 uses candidate merchant identification criteria which require that the possible candidate merchant be located within a predetermined distance of the input merchant in order to be identified as a candidate merchant. For example, recommender computing device 112 may compare the location of the possible candidate merchant to the location of the input merchant and only identify the candidate merchant if the difference is less than a predetermined amount (e.g., 15 miles). The location of the possible candidate merchant and/or the input merchant may be determined from location information included in the transaction data and/or retrieved from a database of merchant information using corresponding merchant identifiers included in the transaction data. In further embodiments, the recommender computing device 112 filters the transaction data such that candidate merchants are only identified using transactions which occurred outside the trade area of the selected cardholder (e.g., outside of a 20 mile radius from the selected cardholders home zip code). The trade area of the selected cardholder may be a geographic region, political subdivision (e.g., city, county, etc.), or other predefined area in which the selected cardholder maintains a residence (e.g., the selected cardholders zip code). The trade area of the selected cardholder may be determined by the recommender computing device 112 by querying a database storing trade areas corresponding to cardholder identifiers (e.g., PANs). The recommender computing device 112 compares merchant location information (e.g., an address) included in the transaction data to the trade area of the selected cardholder and discards or otherwise does not use transaction data in which the merchant is located within the trade area of the selected cardholder. When the merchant location information is outside of the selected cardholder's trade area, the merchant may be identified as a candidate merchant (e.g., if other filter parameters or criteria are also met).

In further embodiments, the recommender computing device 112 uses the selected cardholder's trade area and transaction data to identify a travel window of the selected cardholder. In some embodiments, the recommender computing device 112 only identifies candidate merchants corresponding to transactions occurring within the travel window. To identify the travel window, the recommender computing device 112 may first identify a transaction occurring outside the selected cardholder's trade area as described above. The recommender computing device 112 may designate the corresponding transaction as the start of the travel window and/or define the start of the travel window using the time stamps retrieved from the transaction data corresponding to the transaction. The recommender computing device 112 defines the end of the travel window by identifying a transaction, occurring after the start of the travel window and nearest in time to the start of the travel window, which occurs in the selected cardholder's trade area. The recommender computing device 112 compares the time stamps of the transactions to the state of the travel window previously identified and stored in memory and compares merchant location information in the transaction data to the selected cardholder's trade area previously retrieved and stored in memory in order to identify the transaction defining the end of the travel window. The time stamp of this transaction may be stored in memory as the end of the travel window. Transactions identified by the recommender computing device 112 as falling within the travel window (e.g., occurring between the start transaction and the end transaction and/or having a time stamp falling between the start and end of the travel window) are used to identify candidate merchants. In alternative embodiments, the recommender computing device 112 only identifies candidate merchants corresponding to transactions occurring outside of the travel window.

In some embodiments, the recommender computing device 112 uses candidate merchant identification criteria which require that a possible candidate merchant be a merchant of a particular type in order to be identified as a candidate merchant. For example, the recommender computing device 112 may require that a merchant be a restaurant in order to be identified as a candidate merchant. In further embodiments, the recommender computing device 112 may require that a merchant be one of a plurality of possible merchant types (e.g., restaurant, retailer, entertainer, etc.) in order to be identified as a candidate merchant. The recommender computing device 112 determine possible candidate merchant's merchant type using an MCC code and/or other information included in the transaction data. For example, the recommender computing device 112 may compare an MCC from the transaction data to one or more MCC of the candidate merchant identification criteria and only identify the merchant as a candidate merchant if there is a match. In further embodiments, the recommender computing device 112 may retrieve additional merchant type information about the possible candidate merchant. For example, the recommender computing device 112 may query a database of merchant types using the possible candidate merchant's identifier or other identifying information to retrieve a merchant type which is compared to the candidate merchant identification criteria.

When the recommender computing device 112 identifies a candidate merchant, the recommender computing device 112 stores a merchant identifier corresponding to the candidate merchant in a database (e.g., input merchant records 550) as an entry associated with the input merchant. The recommender computing device 112 retrieves the merchant identifier of the candidate merchant from the transaction data which was identified as corresponding to the selected cardholder. In other words, the recommender computing device 112 parses the transaction data which includes the selected cardholder's cardholder identifier and a merchant identifier to retrieve the merchant identifier. In some embodiments, the recommender computing device 112 maintains a counter for each candidate merchant in the database (e.g., input merchant records 550). The counter may be a database entry which is linked or associated with the candidate merchant (e.g., stored as a tuple with the candidate merchant). The recommender computing device 112 upon identifying a candidate merchant compares the merchant identifier of the newly identified candidate merchant to the merchant identifiers of the candidate merchants already stored in the database. If there is a match, the recommender computing device 112 adds a value of one to the counter database entry associated with the matched candidate merchant already stored in the database. If there is not a match, the recommender computing device 112 adds a new entry to the database corresponding to the newly identified candidate merchant and includes a counter value of one. In some embodiments, the recommender computing device 112 further stores transaction data for each transaction identifying a candidate merchant in the database for use in other functions such as categorizing the candidate merchant and/or otherwise generating the merchant recommendations.

In some embodiments, the recommender computing device 112 categorizes the candidate merchants and/or otherwise stores additional information about the candidate merchants in the database (e.g., input merchant records 550). The categorization of the identified candidate merchants may occur as part of the Candidate Merchant Identification Phase discussed herein. The categorization of the identified candidate merchants may also be carried out by one or more algorithmic steps described herein with reference to the Candidate Merchant Identification Phase and/or additional algorithms as executed by a candidate merchant identification module 570 and/or other program(s) or functions stored in memory of the recommender computing device 112.

In some embodiments, the recommender computing device 112 categorizes the identified candidate merchants based on MCCs included in the transaction data used to identify the candidate merchant. In further embodiments, the recommender computing device 112 uses a plurality of transaction data corresponding to each identified candidate merchant in order to categorize the candidate merchant. For example, the recommender computing device 112 may use analytics based on the plurality of transaction data to categorize the identified candidate merchant by price (e.g., expensive, moderate, cheap, etc.). This categorization may be based on an average transaction amount across the plurality of the transaction data as compared to predetermined categorization ranges. The recommender computing device 112 may also take the merchant type into account when determining the price categorization. For example, the predetermined categorization ranges may differ depending on the merchant type (e.g., the ranges are higher for a jeweler than for a restaurant).

The recommender computing device 112 may use transaction data to further categorization identified candidate merchants based on other information. For example, identified candidate merchants may be categorized by time of day (e.g., morning, afternoon, night, etc.) or season (e.g., winter, spring, summer, fall, etc.) in which the identified candidate merchant is more frequently patronized by its customers. This may assist a user receiving the merchant recommendation in determining if the recommendation is relevant to them or may increase the accuracy of the recommendations provided by the recommender computing device. For example, a merchant operating a water park may have many customers, but the recommender computing device 112 categorizes the merchant as a summer merchant such that it is not included in recommendations provided in the winter. To categorize a merchant based on time or day and/or season, the recommender computing device 112 uses a plurality of transaction data and time stamps and/or transaction dates included in the transaction data. For example, the recommender computing device 112 may define the times of day and/or seasons as including specific ranges (e.g., 6 AM to 10 AM for morning, December 1 to February 28 for winter, etc.). The recommender computing device 112 determines in which range the greatest percentage of transactions occurred by comparing the time stamps and/or dates of the transaction data to the ranges. The range having the greatest percentage of transactions is selected and used to categorize the identified candidate merchant.

In further embodiments, recommender computing device 112 categorizes the identified candidate merchants based on information received from one or more additional databases. These additional databases may be maintained by the recommender computing device 112 or otherwise be accessible directly by the recommender computing device 112 or these databases may be third party databases maintained by others. Recommender computing device 112 queries the database with information identifying the candidate merchant such as a merchant identifier, merchant name, merchant address, and/or other information. Recommender computing device 112 receives from the database categorization information corresponding to the candidate merchant.

In one embodiment, recommender computing device 112 queries external server 504 which maintains a merchant categorization database. The query includes information identifying the candidate merchant and a request for categorization information corresponding to the identified candidate merchant. External server 504 transmits third party merchant information 542 to recommender computing device 112 in response to the query, and recommender computing device 112 receives the third part merchant information 542. For example, external server 504 may be a restaurant review service, general merchant review service, or other source of merchant information.

Once the recommender computing device 112 has categorized an identified candidate merchant, the categorization information is stored in a database and associated with the candidate merchant. For example, recommender computing device 112 may store the categorization information in input merchant records 550 as corresponding to a candidate merchant identified for a particular input merchant. In some embodiments, multiple categories may be stored for each candidate merchant. For example, candidate merchants and associated information stored in input merchant records may be stored as a tuple or other data structure which includes category information entries corresponding to a merchant type (e.g., restaurant), sub type (e.g., a cuisine type such as Chinese), a price categorization (e.g., moderately expensive), a time of day indication (e.g., popular for dinner/at night), a season indication (e.g., most popular in fall), and or other entries.

Using the candidate merchants and/or the candidate merchant categorizations, the recommender computing device 112 generates a recommendation for the input merchant for which the candidate merchants have been identified, during a Recommendation Generation Phase. The recommender computing device 112 generates a recommendation by listing the candidate merchants in descending order of transaction volume such that the most patronized candidate merchant is listed first. The recommender computing device 112 may further filter the recommendations based on predetermined criteria and/or filter options 512 received from a user device 502. The recommender computing device 112 may perform these functions and/or those described with reference to the Recommendation Generation Phase using the algorithmic steps described and/or additional algorithms as executed by a recommendation generation module 580 and/or other program(s) or functions stored in memory of the recommender computing device 112.

In one embodiment, the recommender computing device 112 generates a ranked list which serves as the merchant recommendations for the input merchant. The ranked list includes candidate merchants identified for the input merchant ranked in descending order of transaction volume. For example, the recommender computing device 112 counts the number of transactions stored in the database (e.g., input merchant records 550) corresponding to each candidate merchant in order to determine the transaction volume for each candidate merchant. In alternative embodiments, the recommender computing device 112 uses a sorting algorithm to rank each candidate merchant based on a counter value stored in the database and corresponding to the number of transactions between selected cardholders and the candidate merchant. The ranked list is stored in memory.

The ranked list includes information identifying the candidate merchants. For example, the ranked list includes, for each candidate merchant, a merchant identifier, merchant name, merchant address, and/or other identifying information. The ranked list may also include additional information corresponding to each candidate merchant. For example, the ranked list may include merchant category information such as merchant type (e.g., restaurant), sub type (e.g., a cuisine type such as Chinese), a price categorization (e.g., moderately expensive), a time of day indication (e.g., popular for dinner/at night), a season indication (e.g., most popular in fall), and or other category information. The ranked list may include analytical information such as the average transaction amount for each candidate merchant. The ranked list may also include additional information about each candidate merchant such as contact information (e.g., a telephone number, web address, etc.).

Once all candidate merchants have been ranked, the recommender computing device 112 may apply one or more filers to the ranked list. The recommender computing device 112 may apply predetermined filters to the ranked list of candidate merchants. For example, the recommender computing device 112 may limit the ranked list to the top 10 candidate merchants by transaction volume. All other candidate merchants are removed from the ranked list by deleting their entries from the list stored in memory. The recommender computing device 112 may exclude candidate merchants from the ranked list which do not have a predetermined number of transactions. For example, the recommender computing device 112 may exclude candidate merchants from the ranked list which have fewer than 10 transactions or a counter value of less than 10, the recommender computing device 112 comparing the number of transaction or counter value to the predetermine requirement.

In some embodiments, the recommender computing device 112 filters the ranked list based on filter options 512 received from a user device 502. In some embodiments, filter options 512 are received by the recommender computing device 112 before the recommendation is generated. For example, a user may provide filter options 512 when enrolling in the recommendation program. In alternative embodiments, filter options 512 are received after identification of candidate merchants but prior to generation of the recommendation. For example, a user may request merchant recommendations based on an input merchant using user device 502 and include in the request filter options 512 which control the candidate merchants included in the recommendation. In further alternative embodiments, filter options 512 are received after the recommendation generation and are used to filter the ranked list prior to output. The filter options 512 may be included in a request for merchant recommendations submitted via user device 502. In still further embodiments, the filter options 512 are not provided to recommender computing device 112 but are rather used by user device 502 to filter the ranked list provided to user device 502 by recommender computing device 112.

Filter options 512 may include parameters by which the ranked list is filtered. For example, filter options 512 may specify that the ranked list order candidate merchants based on transaction volume occurring within a particular time window (e.g., between 7 AM and 10 AM). The recommender computing device 112 uses the designated time window and compares the transaction data stored in the database and corresponding to each candidate merchant to filter out transactions not having time stamps within the time window. Based on the remaining number of transactions for each candidate merchant, the recommender computing device 112 ranks the candidate merchants by number of transactions.

Alternatively, filter options 512 may specify one or more merchant categories in which the candidate merchants of the recommendation must fall. For example, filter options 512 may specify that the recommendation include merchants which are restaurants and which are primarily breakfast establishments. The recommender computing device 112 filters the list of candidate merchants by comparing the categorization of each candidate merchant to the filter options 512 and excluding candidate merchants with categorizations which do not meet the filter options 512. For example, the recommender computing device 112 compares the merchant type category to the filter option 512 of restaurant and excludes candidate merchants from the ranked list if the merchant type category is not restaurant.

Similarly, the recommender computing device 112 compares the time of day indication of the candidate merchants to the filter option 512 of breakfast and excludes candidate merchants from the ranked list if the time of day indication is not breakfast.

The generated merchant recommendations are stored in a database associated with the input merchant for which the recommendations are generated. For example, the ranked and/or filtered ranked list is stored in input merchant records 550 as merchant recommendations 552. Multiple ranked lists may be stored in merchant recommendations 552 for each input merchant. For example, a plurality of ranked lists filtered according to different filter options 512 may be stored in merchant recommendations 552. These ranked lists may be filtered and stored based on previously received filter options 512 and/or based on possible or frequently requested filter option 512 combinations. This allows for merchant recommendations 552 to store different recommendation possibilities for an input merchant and output them (e.g., upon request by matching the filter options 512 received in the request to the filter options 512 used in generating the merchant recommendations 552).

After the recommender computing device 112 generates the merchant recommendation(s) 552, recommender computing device 112 outputs the merchant recommendation(s) 552 to one or more parties or users. The recommender computing device 112 may output the merchant recommendation(s) 552 automatically (e.g., periodically) or in response to a request for merchant recommendations corresponding to a particular input merchant. The output of merchant recommendation(s) 552 may occur as part of the Recommendation Output Phase discussed herein. The output of merchant recommendation(s) 552 may also be carried out by one or more algorithmic steps described herein with reference to the Recommendation Output Phase and/or additional algorithms as executed by an output module and/or other program(s) or functions stored in memory of the recommender computing device 112.

In some embodiments, merchant recommendation(s) 552 are output electronically as output 590 to one or more user devices 502. A user device 502 may be associated with a party such as an input merchant, a cardholder, an input merchant patron, a merchant bank, an issuer bank, and/or other parties. The output 590 may include the information included in the merchant recommendation(s) 552 such as the ranked list. The output 590 may further include formatting and/or display instructions which cause the ranked list to be displayed by the user device 502 in a certain manner. Output 590 may further include instructions which cause an application or other program run on user device 502 to display merchant recommendation(s) 552 and or other information. Output 590 may further be or include e-mail sent to a party which includes merchant recommendation(s) 552, a website hosted by the recommender computing device 112 and including merchant recommendation(s) 552 for one or more input merchants and/or a graphical user interface for retrieving and displaying the merchant recommendation(s) 552, and/or any other type of output (e.g., physical mail including the ranked list and mailed or delivered to a party).

In some embodiments, recommender computing device 112 transmits output 590 to an input merchant's user device 502, the input merchant having enrolled in the recommendation program. The recommender computing device 112 may transmit, output 590 including merchant recommendation(s) 552, to the input merchant periodically (e.g., daily, weekly, monthly, quarterly, yearly, etc.). The input merchant may transmit a request for merchant recommendation(s) 552 to the recommender computing device 112 via user device 502. In response, the recommender computing device 112 transmits merchant recommendation(s) 552 as output 590 to user device 502. The input merchant may provide the merchant recommendation(s) 552 to its patrons (e.g., hotel guests). Merchant recommendation(s) 552 may be similarly transmitted as output 590 to other parties such as issuer banks, merchant banks, cardholders, etc. Issuer banks may provide merchant recommendation(s) 552 to cardholder customers as a value added service. Merchant banks may provide merchant recommendation(s) 552 to input merchant customers as a value added service such that the input merchant may provide recommendations to its patrons.

In some embodiments, output 590 is transmitted to a user device 502 associated with a cardholder and includes instructions for displaying the merchant recommendation(s) 552 within an application running on user device 502. A cardholder may transmit a recommendation request to recommender computing device 112 via user device 502. The request identifies the input merchant (e.g., hotel the cardholder is staying at) and may include filter options 512. The request and information included in the request may be input via the application. For example, the application may include a field in which the cardholder enters the name and/or other identifying information for the target information and/or other graphical user interface elements for inputting and/or outputting information. The recommender computing device 112 receives the request and processes it as described herein. The recommender computing device 112 outputs merchant recommendation(s) 552 as output 590 which includes instructions for displaying merchant recommendation(s) 552 in the application on user device 502.

Figure 6:
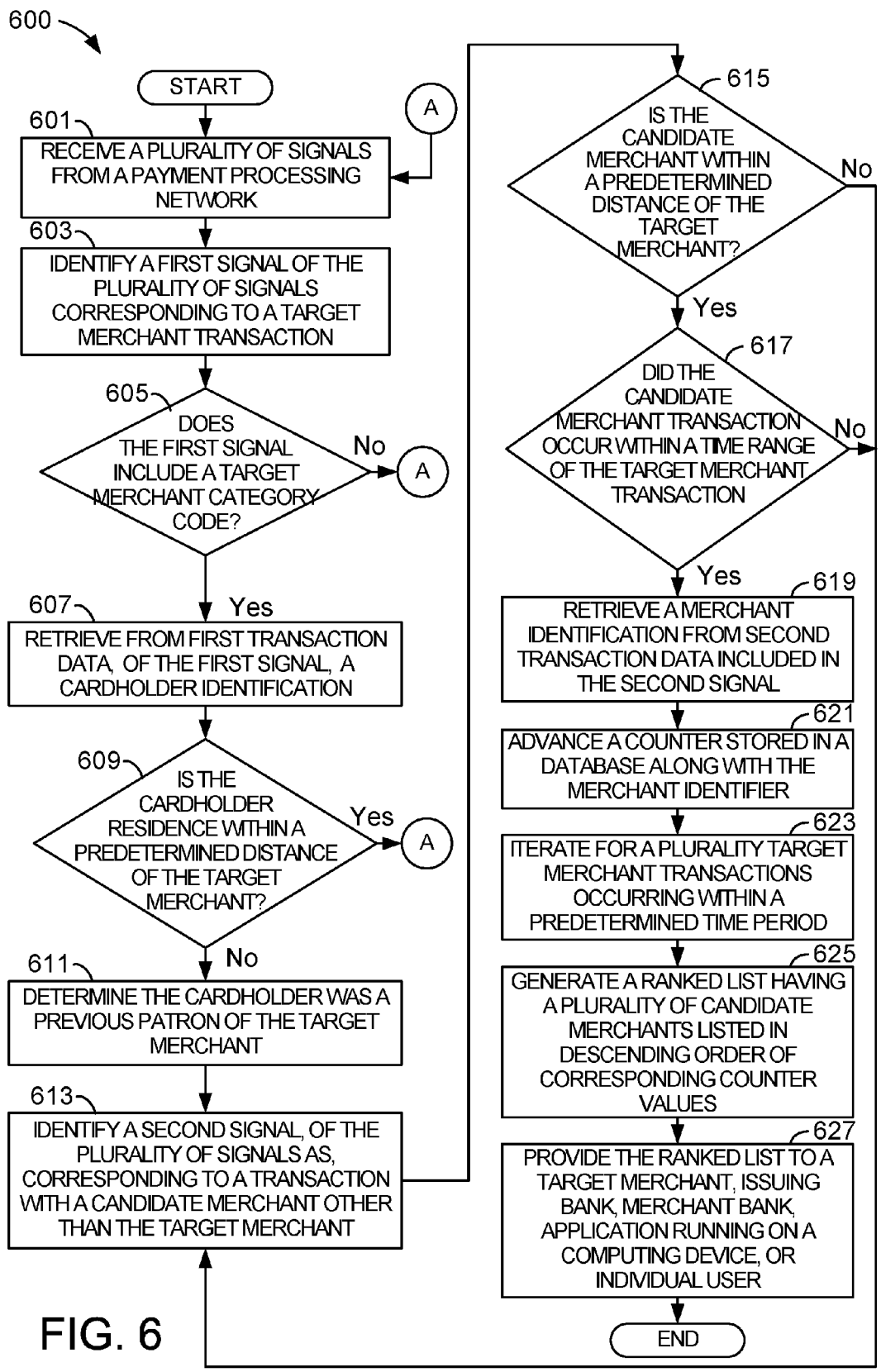

FIG. 6 is a simplified diagram of an example method 600 for generating merchant recommendations for an input merchant and providing the merchant recommendation to one or more parties using recommender computing device 112 (shown in FIG. 2). Specifically, recommender computing device 112 receives 601 a plurality of signals from a payment processing network (e.g., system 20 shown in FIG. 1). Each signal includes transaction data, the signals corresponding to transactions between cardholders and merchants. Recommender computing device 112 identifies 603 a first signal, of the plurality of the plurality of received signals, corresponding to an input merchant transaction. For example, recommender computing device 112 compares an input merchant identifier (e.g., an identification number) to the merchant identifier included in the transaction data of the plurality of signals and identifies the first signal upon determining that the merchant identifiers match. Alternatively or additionally, the recommender computing device 112 may determine 605 if the first signal includes an input merchant category code. If the merchant identifier included in the transaction data is not already stored in a database of input merchants, recommender computing device 112 may add the merchant identifier to the database to generate merchant recommendations for the additional input merchant. Determining 605 that the first transaction signal includes an input merchant category code may further prevent inadvertent identification of the first signal.

Recommender computing device 112 retrieves 607 a cardholder identification from the transaction data included in the first signal. This is a cardholder identification of a candidate cardholder. Recommender computing device 112 may go on to select the candidate cardholder if additional criteria are satisfied. In some embodiments, recommender computing device 112 optionally determines 609 if the cardholder residence is within a predetermined distance of the input merchant (e.g., a hotel). If the cardholder residence is within a predetermined distance of the input merchant, recommender computing device 112 restarts the process. And, if the cardholder residence is not within a predetermined distance of the input merchant, recommender computing device 112 continues the process. In alternative embodiments, the reverse is true (e.g., for input merchants other than hotels).

Recommender computing device 112 determines 611 if the cardholder was a previous patron of the input merchant. In some embodiments, recommender computing device 112 determines that the cardholder was a previous patron based in whole or in part on steps 603-609 or a subset thereof. In some embodiments, recommender computing device 112 applies additional criteria to determine 611 if the candidate cardholder was a previous patron of the input merchant. For example, recommender computing device 112 may determine if the candidate cardholder transacted with the input merchant outside of a trade area of the candidate cardholder and/or during a travel window of the candidate cardholder. Upon determine 611 that the candidate cardholder was a previous patron of the input merchant, recommender computing device 112 selects the candidate cardholder.

Recommender computing device 112 identifies 613 a second signal, of the plurality of signals, as corresponding to a transaction with a candidate merchant other than the input merchant. For example, recommender computing device 112 identifies 613 the second signal by matching the cardholder identifier of the selected cardholder to a cardholder identifier of transaction data included in the plurality of signals, a match resulting in identification of the signal as the second signal. Recommender computing device 112 may optionally determine 615 if the candidate merchant is within a predetermine distance of the input merchant. For example, recommender computing device 112 may compare known location information of the input merchant to location information of the candidate merchant retrieved from the transaction data of the second signal. Recommender computing device 112 may further optionally determine 617 if the candidate merchant transaction of the second signal occurred within a time range of the input merchant transaction of the first signal. For example, recommender computing device 112 may determine if the candidate merchant transaction of the second signal occurred within a travel window of the selected cardholder that includes the input merchant transaction of the first signal. Recommender computing device 112 may further apply filters and/or criteria previously described herein.

Recommender computing device 112 retrieves 619 a merchant identifier from second transaction data included in the candidate merchant transaction of the second signal. Recommender computing device 112 advances 621 a counter stored in a database and associated with the candidate merchant, merchant identifier retrieved from the second transaction data. Recommender computing device 112 iterates 623 these steps for a plurality of input merchant transaction occurring within a predetermine time period (e.g., one year). For example, recommender computing device 112 identifies further candidate merchant transactions made by the same selected cardholder. And, recommender computing device 112 does the same for additional candidate cardholders selected for the input merchant. By iterating 623, recommender computing device 112 builds the database of candidate merchants and counters for a plurality of candidate merchants identified for the input merchant. Each counter advanced when the same candidate merchant is identified based on a different transaction. Recommender computing device 112 generates 625 a ranked list having a plurality of candidate merchants, the candidate merchants in descending order of counter values. Recommender computing device 112 may further generate and/or filter the ranked list as described herein. Recommender computing device 112 provides 627 the ranked list to one or more of the input merchant, an issuing bank, a merchant bank, an application running on a computing device such as a user device, and/or an individual user (e.g., cardholder).

Figure 7:
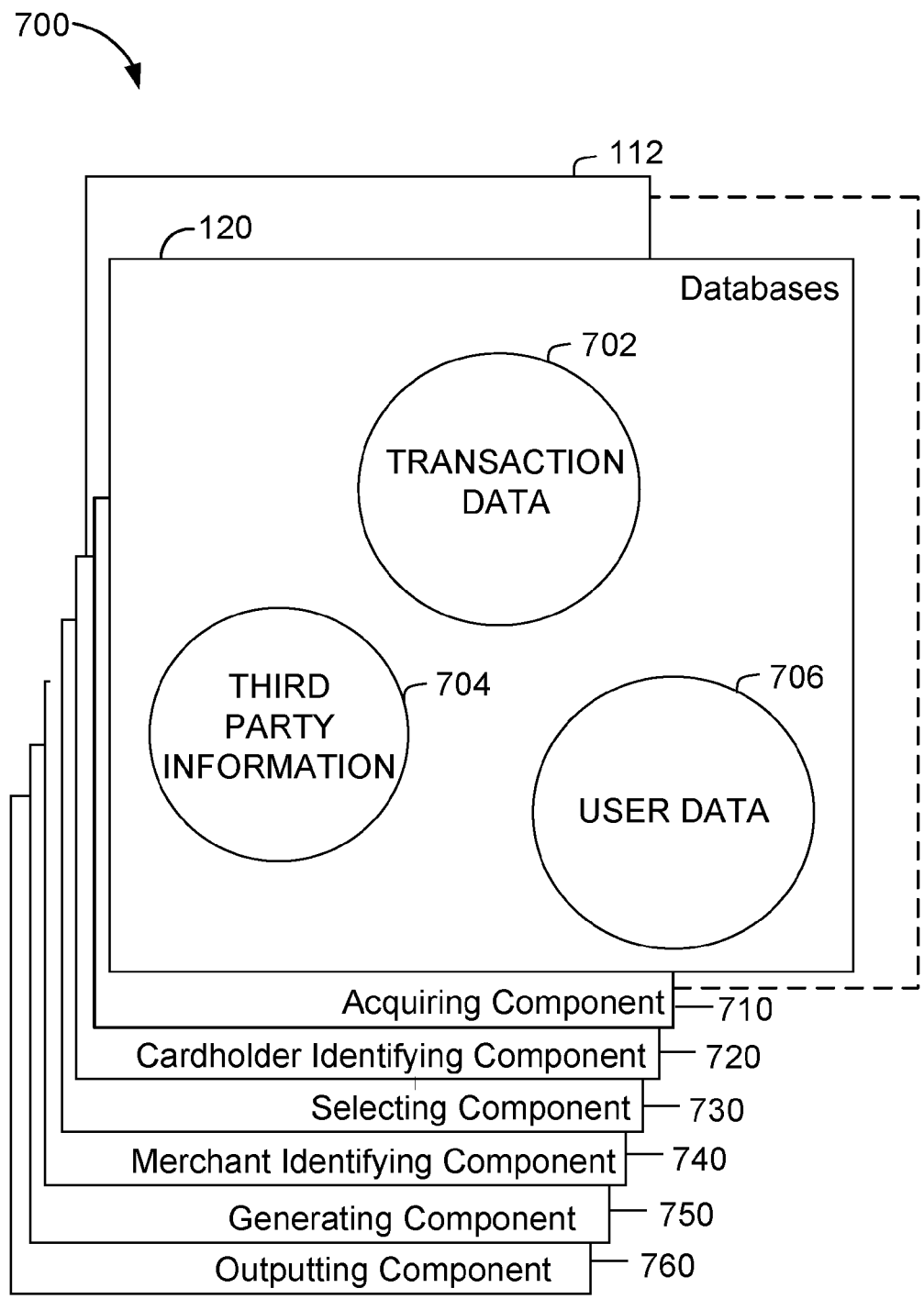

FIG. 7 is a diagram of components of one or more example computing devices that may be used in the environment shown in FIG. 2. FIG. 7 further shows a configuration of databases including at least database 120 (shown in FIG. 2). Database 120 may store information such as, for example, transaction data 702, third party information 704 (e.g., received from a third party database, an external server, or a user device), user data 706, and/or other data. For example, third party information 704 may include information such as merchant categorization information received from a third party database or server queried by recommender computing device 112 and user data 706 may include filter options received from a user device or input merchant information received during an enrollment step. Database 120 is coupled to several separate components within recommender computing device 112, which perform specific tasks or functions.

Recommender computing device 112 includes an acquiring component 710 for acquiring transaction data 702 from a payment processing network. Additionally, recommender computing device 112 includes a cardholder identifying component 720 for identifying cardholders who transacted with the input merchant based on transaction data 702 received using the acquiring component 710. For example, cardholder identifying component identifies candidate cardholders by parsing transaction data 702 to identify transactions including the merchant identifier of the input merchant. The cardholder identifier included in the same transaction data 702 is extracted and used to identify the candidate cardholder. Recommender computing device 112 includes selecting component 730 for selecting candidate cardholders. For example, selecting component 730 applies selecting criteria to candidate cardholders and selects candidate cardholders meeting the selection criteria. For example, the input merchant may be a hotel and the selection criteria may be that the transaction used to identify the candidate cardholder occurred outside a trade area of the candidate cardholder and/or during a travel window of the candidate cardholder.

Recommender computing device 112 includes merchant identifying component 740 for identifying candidate merchants. For example, merchant identifying component 740 uses the cardholder identifier of the selected cardholder parsed from the transaction data 702 to identify, from the transaction data 702, other transactions which are between the selected cardholder and candidate merchants other than the input merchant (e.g., transactions having transaction data 702 which include the cardholder identifier and merchant identifier other than that of the input merchant). Merchant identifying component 740 may further apply other criteria or filters in identifying candidate merchants. For example, merchant identifying component 740 may require that transaction data 702 used to identify a candidate merchant include a card present flag or indication. Other criteria may include that the transaction occur outside of a trade area of the selected cardholder and/or within a travel window of the selected cardholder (e.g., in instances in which the input merchant is a hotel). Merchant identifying component 740 may further categorize identified candidate merchants using user data 706 (e.g., user provided merchant categorizations), third party information 704 (e.g., merchant categorizations retrieved from third party databases), and/or transaction data 702 (e.g., transaction analytics performed to categorize a candidate merchant).

Recommender computing device 112 includes generating component 750 for generating merchant recommendations based on the candidate merchants identified by the merchant identifying component 740. Generating component 750 generates merchant recommendation by, at least in part, ranking the candidate merchants based on the number of transaction identified between selected cardholders and identified candidate merchants. Generating component 750 may apply other criteria and/or filter the ranked list in generating the merchant recommendations. For example, generating component 750 may filter the ranked list based on filter options received from a user and stored in user data 706. These filter options may specify a type of merchant to be included in the recommendation (e.g., a restaurant, retailer, attraction, etc.), a merchant subtype (e.g., Italian restaurant, mall retailer, historical attraction, etc.), a merchant cost (e.g., cheap, moderate, expensive, etc.), a season (e.g., winter, spring, summer, fall, etc.), a time of day in which the merchants popular (e.g., morning, afternoon, evening, etc.), and/or other filter options. Generating component 750 compares the filter options to categorization information associated with the candidate merchants and filters out those candidate merchants with categorization information not satisfying the filter parameters.

Recommender computing device 112 includes an outputting component 760 for outputting merchant recommendations generated by generating component 750. For example, outputting component 760 may control a communications interface used to transmit the merchant recommendations to a user device associated with an input merchant customer, the input merchant, a merchant bank, an issuer bank, or a reservation service (e.g., a hotel booking service). Outputting component 760 may output merchant recommendations in response to a received request and/or periodically. Outputting component 760 may output formatting information, instructions, and/or other information with the merchant recommendations which are used by a user device to display the merchant recommendations or otherwise provide the merchant recommendation to a party.

This written description describes storing information as tuples. It should be understood that this is an exemplary embodiment. Tuples may include string entries, numerical entries, file location entries, files storing a plurality of information, pages, and/or other entries. In alternative embodiments, other database storage techniques may be used in place of, or in combination with, the use of tuples. For example, information may be stored in a database using a B+ tree structure, unordered structure, ordered structure, heap files structure, hash buckets structure, and/or other structure. Information may be stored such that entries of information are linked by any type of relationship corresponding to entries in the same tuple as described herein.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device.

Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

In addition, although various elements of the recommender computing device are described herein as including general processing and memory devices, it should be understood that the recommender computing device is a specialized computer configured to perform the steps described herein for generating and displaying merchant recommendations for an input merchant.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for generating a list of recommended merchants based, at least in part, on an input merchant, the method implemented using a recommender computing device in communication with a memory and a payment processor, said method comprising:

receiving, by the recommender computing device, an input merchant identifier for identifying the input merchant;

enrolling, by the recommender computing device using the input merchant identifier, the input merchant in a recommendation program;

storing, by the recommender computing device, the input merchant identifier within the memory;

receiving, by the recommender computing device, a request for merchant recommendations from a merchant user device associated with the input merchant;

retrieving, by the recommender computing device, a first electronic data signal from a database associated with the payment processor based at least in part on the input merchant identifier, the first electronic data signal including historical transaction data of the input merchant including a plurality of historical payment transactions having been initiated by candidate cardholders with the input merchant;

storing, by the recommender computing device, a list of the candidate cardholders in the memory from the first electronic data signal;

retrieving, by the recommender computing device, a second electronic data signal from the payment processor database, the second electronic data signal including historical transaction data for at least some of the candidate cardholders included in the list of candidate cardholders, the historical transaction data for the candidate cardholders including one or more candidate merchant identifiers, each of the one or more candidate merchant identifiers identifying a candidate merchant of a plurality of candidate merchants, each candidate merchant of the plurality of candidate merchants involved in at least one transaction of the plurality of historical payment transactions;

generating, by the recommender computing device, a list of candidate merchants from the second electronic data signal including a ranking of the plurality of candidate merchants;

generating by the recommender computing device, a list of recommended merchants based on the list of candidate merchants and the ranking; and transmitting, by the recommender computing device, the list of recommended merchants to the merchant user device.

2. The method of claim 1, further comprising advancing counters associated for at least a subset of the plurality of candidate merchants identified in the second electronic data signal based on each instance of the one or more candidate merchant identifiers being included in the second electronic data signal.

3. The method of claim 2, wherein the list of recommended merchants includes a subset of the list of candidate merchants in descending order of corresponding counter values.

4. The method of claim 1, further comprising:
retrieving, from the second electronic data signal, category information associated with the plurality of candidate merchants; and
categorizing the plurality of candidate merchants by assigning a category to each candidate merchant based on the category information,
wherein the list of recommended merchants includes the plurality of candidate merchants listed by category and by rank.

5. The method of claim 4, wherein the category information is at least one of a merchant category code, an industry code, or a retail industry code.

6. The method of claim 4, wherein the category is at least one of a restaurant category, an entertainment category, an attraction category, or a shopping category.

7. The method of claim 1, further comprising:
querying a remote database with a plurality of candidate merchant identifiers;
requesting category information for the plurality of candidate merchants associated with the plurality of candidate merchant identifiers; and
receiving the requested category information,
wherein the list of recommended merchants includes the plurality of candidate merchants listed by category based on the category information received from the remote database, and by rank.

8. The method of claim 1, further comprising providing the list of recommended merchants to at least one of an input merchant customer, a merchant bank, an application running on a user device, or a hotel booking service.

9. The method of claim 1, further comprising transmitting instructions to a user device running an application, wherein the instructions are formatted to cause the application to display the list of recommended merchants.

10. The method of claim 1, further comprising generating historical transaction data for a plurality of input merchants by filtering a plurality of transaction signals to remove all signals which do not correspond to a transaction at a hotel using a merchant category code included in the plurality of transaction signals, and sorting the transactions signals based on input merchant identifiers included in the transaction signals and associated with each of the plurality of input merchants.

11. The method of claim 1, further comprising:
comparing, for each candidate cardholder, an input merchant location, based on location data corresponding to the input merchant and included in the first electronic data signal, with a residence location of the candidate cardholder;
determining, for each candidate cardholder, if the candidate cardholder residence location is greater than a predetermined distance from the input merchant location; and
excluding, for each candidate cardholder, the historical transaction data associated with the candidate cardholder in response to determining that the candidate cardholder residence location is not greater than the predetermined distance from the input merchant location.

12. The method of claim 11, wherein the candidate cardholder residence location is based on either (a) a known zip code of the candidate cardholder residence location or (b) a modeled zip code of the candidate cardholder residence location determined based on the candidate cardholder's previous transactions.

13. The method of claim 1, further comprising:
comparing, for each candidate merchant, an input merchant location, based on location data corresponding to the input merchant and included in the first electronic data signal, with a candidate merchant location, based on location data included in the second electronic data signal;
determining, for each candidate merchant, if the candidate merchant location is within a predetermined distance from the input merchant location; and
excluding, for each candidate merchant, the historical transaction data including a corresponding candidate merchant identifier in response to determining that the associated candidate merchant location is not within a predetermined distance from the input merchant location.

14. The method of claim 1, further comprising:
comparing, for each transaction included in the historical transaction data for each cardholder, a first time stamp associated with the transaction with a second time stamp of a transaction having the same candidate cardholder identifier and included in the historical transaction data of the input merchant;
determining, for each transaction included in the historical transaction data for each cardholder, if the first time stamp and the second time stamp are within a predetermined time range; and
excluding transaction data included in the historical transaction data for each cardholder in response to determining that the first time stamp and the second time stamp are not with the predetermined time range.

15. The method of claim 1, further comprising:
determining, for each transaction of the historical transaction data for each candidate cardholder, if the historical transaction data associated with the transaction includes a card present transaction type identifier; and
excluding the historical transaction data associated with the transaction in response to determining that the transaction does not include a card present transaction type identifier.

16. A recommender computing device comprising at least one processor in communication with a memory, said recommender computing device in communication with a payment processor, said at least one processor programmed to:
receive an input merchant identifier for identifying the input merchant;
enroll, using the input merchant identifier, the input merchant in a recommendation program;
store the input merchant identifier within the memory;
receive a request for merchant recommendations from a merchant user device associated with the input merchant;
retrieve a first electronic data signal from a database associated with the payment processor based at least in part on the input merchant identifier, the first electronic data signal including historical transaction data of the input merchant including a plurality of historical payment transactions having been initiated by candidate cardholders with the input merchant;
store a list of the candidate cardholders in the memory from the first electronic data signal;
retrieve a second electronic data signal from the payment processor database, the second electronic data signal including historical transaction data for at least some of the candidate cardholders included in the list of candidate cardholders, the historical transaction data for the candidate cardholders including one or more candidate merchant identifiers, each of the one or more candidate merchant identifiers identifying a candidate merchant of a plurality of candidate merchants, each candidate merchant of the plurality of candidate merchants involved in at least one transaction of the plurality of historical payment transactions;
generate a list of candidate merchants from the second electronic data signal including a ranking of the plurality of candidate merchants;
generate a list of recommended merchants based on the list of candidate merchants and the ranking; and
transmit the list of recommended merchant to the merchant user device.

17. The recommender computing device of claim 16, wherein said at least one processor is further programmed to:
query a remote database with a plurality of candidate merchant identifiers;
request category information for the plurality of candidate merchants associated with the plurality of candidate merchant identifiers; and
receive the requested category information,
wherein the list of recommended merchants includes the plurality of candidate merchants listed by category based on the category information received from the remote database, and by rank.

18. The recommender computing device of claim 16, wherein said at least one processor is further programmed to:
compare, for each candidate cardholder, an input merchant location, based on location data corresponding to the input merchant and included in the first electronic data signal, with a residence location of the candidate cardholder;
determine, for each candidate cardholder, if the candidate cardholder residence location is greater than a predetermined distance from the input merchant location; and
exclude, for each candidate cardholder, the historical transaction data associated with the candidate cardholder in response to determining that the candidate cardholder residence location is not greater than the predetermined distance from the input merchant location.

19. The recommender computing device of claim 16, wherein said at least one processor is further programmed to:
compare, for each transaction included in the historical transaction data for each cardholder, a first time stamp associated with the transaction with a second time stamp of a transaction having the same candidate cardholder identifier and included in the historical transaction data of the input merchant;
determine, for each transaction included in the historical transaction data for each cardholder, if the first time stamp and the second time stamp are within a predetermined time range; and
exclude transaction data included in the historical transaction data for each cardholder in response to determining that the first time stamp and the second time stamp are not with the predetermined time range.

20. A computer-readable storage medium having computer-executable instructions embodied thereon, wherein when executed by a recommender computing device including at least one processor in communication with a memory, the recommender computing device in communication with a payment processor, the computer-executable instructions cause the recommender computing device to:
receive an input merchant identifier for identifying the input merchant;
enroll, using the input merchant identifier, the input merchant in a recommendation program;
store the input merchant identifier within the memory;
receive a request for merchant recommendations from a merchant user device associated with the input merchant;
retrieve a first electronic data signal from a database associated with the payment processor based at least in part on the input merchant identifier, the first electronic data signal including historical transaction data of the input merchant including a plurality of historical payment transactions having been initiated by candidate cardholders with the input merchant;
store a list of the candidate cardholders in the memory from the first electronic data signal;
retrieve a second electronic data signal from the payment processor database, the second electronic data signal including historical transaction data for at least some of the candidate cardholders included in the list of candidate cardholders, the historical transaction data for the candidate cardholders including one or more candidate merchant identifiers, each of the one or more candidate merchant identifiers identifying a candidate merchant of a plurality of candidate merchants, each candidate merchant of the plurality of candidate merchants involved in at least one transaction of the plurality of historical payment transactions;
generate a list of candidate merchants from the second electronic data signal including a ranking of the plurality of candidate merchants;
generate a list of recommended merchants based on the list of candidate merchants and the ranking; and
transmit the list of recommended merchant to the merchant user device.

* * * * *

UNITED STATES PATENT AND TRADEMARK OFFICE
CERTIFICATE OF CORRECTION

PATENT NO. : 10,163,147 B2
APPLICATION NO. : 14/966838
DATED : December 25, 2018
INVENTOR(S) : Edward M. Lee et al.

It is certified that error appears in the above-identified patent and that said Letters Patent is hereby corrected as shown below:

In the Specification

Column 14, Line 17, delete "between LOAM and 2 PM" and insert therefor -- between 10 AM and 2 PM --.

Signed and Sealed this
Twenty-sixth Day of November, 2019

Andrei Iancu
*Director of the United States Patent and Trademark Office*